(12) United States Patent
Tan et al.

(10) Patent No.: US 11,209,864 B2
(45) Date of Patent: Dec. 28, 2021

(54) FLEXIBLE TOUCH PANEL COMPRISING A FLEXIBLE SUBSTRATE WITH A FAN-OUT REGION, MANUFACTURING METHOD THEREOF AND FLEXIBLE TOUCH DISPLAY

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Yichuan Tan, Beijing (CN); Yuxiang Ma, Beijing (CN); Qi Yin, Beijing (CN); Jian Xu, Beijing (CN); Li Ma, Beijing (CN); Tongsheng Fan, Beijing (CN); Xiaosuo Ma, Beijing (CN); Qingchao Meng, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 6 days.

(21) Appl. No.: 16/569,156

(22) Filed: Sep. 12, 2019

(65) Prior Publication Data

US 2020/0004294 A1  Jan. 2, 2020

Related U.S. Application Data

(63) Continuation-in-part of application No. PCT/CN2019/079338, filed on Mar. 22, 2019.

(30) Foreign Application Priority Data

May 11, 2018 (CN) .......................... 201810446619.3

(51) Int. Cl.
*G06F 1/16* (2006.01)
*G06F 3/041* (2006.01)
(Continued)

(52) U.S. Cl.
CPC .......... *G06F 1/1643* (2013.01); *G06F 1/1626* (2013.01); *G06F 1/1652* (2013.01); *G06F 3/0412* (2013.01); *G09F 9/301* (2013.01)

(58) Field of Classification Search
CPC .... G06F 1/1643; G06F 1/1626; G06F 1/1652; G06F 3/0412; G06F 3/0446;
(Continued)

(56) References Cited

U.S. PATENT DOCUMENTS 9,569,020 B2   2/2017  Park et al.
2010/0110041 A1*  5/2010  Jang ...................... G06F 3/0416
                                                345/174
(Continued)

FOREIGN PATENT DOCUMENTS

CN    103838415 A   6/2014
CN    106775154 A   5/2017
(Continued)

*Primary Examiner* — David D Davis
(74) *Attorney, Agent, or Firm* — Kinney & Lange, P.A.

(57) ABSTRACT

A flexible touch panel includes a flexible substrate including a flexible substrate body and at least one flexible substrate extension, in which the flexible substrate body is contiguous with the at least one flexible substrate extension. A plurality of touch units are provided on the flexible substrate body. A plurality of signal lines are disposed on the flexible substrate and electrically connected to the plurality of touch units. Each of the plurality of signal lines includes a first portion on the flexible substrate body and a second portion on the flexible substrate extension, so that each of the plurality of signal lines directly connects to an external driving circuit, and some of the plurality of signal lines include a material different from others of the plurality of signal lines.

19 Claims, 16 Drawing Sheets

(51) Int. Cl.
*G06F 9/30* (2018.01)
*G09F 9/30* (2006.01)

(58) Field of Classification Search
CPC ......... G06F 3/0443; G06F 2203/04102; G06F 2203/04111; G06F 3/04164; G06F 3/044; G09F 9/301
See application file for complete search history.

(56) References Cited

U.S. PATENT DOCUMENTS

| | | | |
|---|---|---|---|
| 2011/0141042 A1* | 6/2011 | Kim | G06F 3/0412 345/173 |
| 2015/0331513 A1* | 11/2015 | Lee | G06F 3/044 345/173 |
| 2016/0195969 A1* | 7/2016 | Kim | G06F 3/044 345/173 |
| 2016/0202812 A1* | 7/2016 | Pyoun | G06F 3/0412 345/173 |
| 2016/0209959 A1* | 7/2016 | Lee | G06F 3/044 |
| 2017/0024060 A1* | 1/2017 | Seong | G06F 3/0416 |
| 2018/0095574 A1* | 4/2018 | Kim | G06F 3/0412 |
| 2020/0004294 A1 | 1/2020 | Tan et al. | |
| 2020/0189263 A1* | 6/2020 | Smith | B41F 31/13 |

FOREIGN PATENT DOCUMENTS

| | | | |
|---|---|---|---|
| CN | 106843611 A | * | 6/2017 |
| CN | 106843611 A | | 6/2017 |
| CN | 106873820 A | | 6/2017 |
| CN | 108646946 A | | 10/2018 |

* cited by examiner

FLEXIBLE TOUCH PANEL COMPRISING A FLEXIBLE SUBSTRATE WITH A FAN-OUT REGION, MANUFACTURING METHOD THEREOF AND FLEXIBLE TOUCH DISPLAY

CROSS-REFERENCE TO RELATED APPLICATION

This application is a continuation-in-part of International Application No. PCT/CN2019/079338, filed on Mar. 22, 2019, entitled "FLEXIBLE TOUCH PANEL, MANUFACTURING METHOD THEREOF AND FLEXIBLE TOUCH DISPLAY", which in turn claims the benefit of Chinese Patent Application No. 201810446619.3 filed on May 11, 2018 in the National Intellectual Property Administration of China, the whole disclosures of which are incorporated herein by reference.

TECHNICAL FIELD

The present disclosure relates to the field of touch technology, and more particularly to a flexible touch panel and a method of manufacturing the flexible touch panel, and a flexible touch display including the flexible touch panel.

BACKGROUND

As touch electronic devices such as smart phone and tablet become popular, touch screens have become an indispensable part of people's production and life. In a process of manufacturing a touch screen, it is generally required to connect a flexible circuit board to a body of the touch screen through a bonding process, and then connect the flexible circuit board to a driving circuit which is required to be connected, in order to realize a communication and a control between the driving circuit and the body of the touch screen. Here, the flexible circuit board is utilized to connect the driving circuit with the body of the touch screen, so that the driving circuit may be folded and fixed onto a back face of the touch panel by means of the flexible circuit board after an assembly is completed, thereby reducing an occupying space of a finished product.

SUMMARY

In one aspect, a flexible touch panel is provided, including: a flexible substrate including a flexible substrate body and at least one flexible substrate extension, the flexible substrate body being contiguous with the at least one flexible substrate extension; a plurality of touch units on the flexible substrate body; and a plurality of signal lines which are disposed on the flexible substrate and electrically connected to the plurality of touch units, wherein each of the signal lines includes a first portion on the flexible substrate body and a second portion on the flexible substrate extension so that each of the signal lines is directly connectable to an external driving circuit, and some of the signal lines include a material different from the other of the signal lines.

For example, the flexible substrate body and the flexible substrate extension are integrally formed.

For example, the first portion and the second portion of each of the signal lines are integrally formed.

Optionally, the plurality of touch units include a plurality of first electrodes and a plurality of second electrodes, the plurality of signal lines include a plurality of first signal lines electrically connected to the plurality of first electrodes and a plurality of second signal lines electrically connected to the plurality of second electrodes, and each of the plurality of first signal lines and the plurality of second signal lines includes the first portion on the flexible substrate body and the second portion on the flexible substrate extension.

Optionally, the plurality of first electrodes are located in the same layer as the plurality of second electrodes, the plurality of first electrodes are electrically connected with one another through conductive portions, and the plurality of second electrodes are electrically connected with one another through conductive bridges. The conductive portions are located in the same layer as the plurality of first electrodes, the conductive bridges are located in a different layer from the plurality of second electrodes, and an insulating protective layer is disposed between a layer in which the second electrodes are located and a layer in which the conductive bridges are located.

Optionally, both the first signal line and the second signal line are located in the same layer as the conductive bridges.

Optionally, the plurality of first electrodes are located in a different layer from the plurality of second electrodes, the first signal line is located in the same layer as the plurality of first electrodes, and the second signal line is located in the same layer as the plurality of second electrodes.

Optionally, the flexible substrate includes one flexible substrate extension, and the one flexible substrate extension is located on a side of the flexible substrate body facing the external driving circuit.

Optionally, a ratio of an area of an orthographic projection of the one flexible substrate extension in a direction perpendicular to the flexible substrate to an area of an orthographic projection of the flexible substrate body in the direction perpendicular to the flexible substrate is in a range of 1/20 to 1/5.

Optionally, the at least one flexible substrate extension includes a first flexible substrate extension and a second flexible substrate extension, the first flexible substrate extension and the second flexible substrate extension are both located on a side of the flexible substrate body facing the external driving circuit, the first flexible substrate extension is adjacent to one side edge of the flexible substrate body, and the second flexible substrate extension is adjacent to another side edge, opposite to the one side edge, of the flexible substrate body.

Optionally, a ratio of an area of an orthographic projection of each of the first flexible substrate extension and the second flexible substrate extension in a direction perpendicular to the flexible substrate to an area of an orthographic projection of the flexible substrate body in the direction perpendicular to the flexible substrate is in a range of 1/40 to 1/5.

Optionally, the signal lines include a third signal line and a fourth signal line, the third signal line includes a first portion on the flexible substrate body and a second portion on the first flexible substrate extension, and the fourth signal line includes a first portion on the flexible substrate body and a second portion on the second flexible substrate extension.

Optionally, materials of the signal lines are related to lengths of the signal lines, respectively.

Optionally, the signal lines include a fifth signal line and a sixth signal line, a length of the fifth signal line is less than a length of the sixth signal line, and an electrical resistivity of a material of the fifth signal line is larger than an electrical resistivity of a material of the sixth signal line.

Optionally, the material of the fifth signal line includes indium tin oxide, and the material of the sixth signal line includes a metal material.

Optionally, the fifth signal line is located in the same layer as the plurality of first electrodes, the plurality of second electrodes and the conductive portions, and the sixth signal line is located in the same layer as the conductive bridges.

Optionally, the flexible touch panel further includes a fan-out region on the flexible substrate, and the fan-out region is located between the plurality of touch units and the flexible substrate extension, and materials of the signal lines are related to curved radii of the signal lines at the fan-out region, respectively.

Optionally, the signal lines include a seventh signal line and an eighth signal line, a curved radius of the seventh signal line at the fan-out region is less than a curved radius of the eighth signal line at the fan-out region, and a bending strength of a material of the seventh signal line is larger than a bending strength of a material of the eighth signal line.

Optionally, the material of the seventh signal line includes a metal material, and the material of the eighth signal line includes indium tin oxide.

Optionally, the seventh signal line is located in the same layer as the conductive bridges, and the eighth signal line is located in the same layer as the plurality of first electrodes, the plurality of second electrodes and the conductive portions.

In another aspect, a method of manufacturing a flexible touch panel is provided, including:

forming a flexible substrate including a flexible substrate body and at least one flexible substrate extension, the flexible substrate body being contiguous with the at least one flexible substrate extension;

forming a plurality of touch units on the flexible substrate body; and forming a plurality of signal lines electrically connected to the plurality of touch units on the flexible substrate, such that each of the signal lines includes a first portion on the flexible substrate body and a second portion on the flexible substrate extension, and each of the signal lines directly connects to an external driving circuit, wherein some of the signal lines include a material different from the other of the signal lines.

For example, the forming the flexible substrate includes: integrally cutting edges of both the flexible substrate body and the at least one flexible substrate extension to form the flexible substrate, so that the flexible substrate body and the flexible substrate extension are integrally formed.

For example, the first portion and the second portion of each of the signal line are integrally formed.

Optionally, the forming the plurality of signal lines electrically connected to the plurality of touch units on the flexible substrate includes: forming a conductive metal layer on both the flexible substrate body and the at least one flexible substrate extension; and performing a patterning process on the conductive metal layer to form a conductive bridge and the plurality of signal lines.

Optionally, the forming the plurality of signal lines electrically connected to the plurality of touch units on the flexible substrate includes: forming a plurality of first signal lines arranged in the same layer as the first electrodes of the plurality of touch units and electrically connected to the first electrodes of the plurality of touch units; and forming a plurality of second signal lines arranged in the same layer as the second electrodes of the plurality of touch units and electrically connected to the second electrodes of the plurality of touch units.

In a further aspect, a flexible touch display is provided, including the flexible touch panel as described above.

Optionally, the flexible touch display further includes an external driving circuit, wherein the external driving circuit of the flexible touch display is bent to a back face of the flexible substrate by means of the flexible substrate extension.

BRIEF DESCRIPTION OF THE DRAWINGS

The above and other objectives, features and advantages of the present disclosure will become more apparent by describing exemplary embodiments of the present disclosure below in conjunction with accompanying drawings, in which.

DETAILED DESCRIPTION OF EMBODIMENTS

Figure 1:
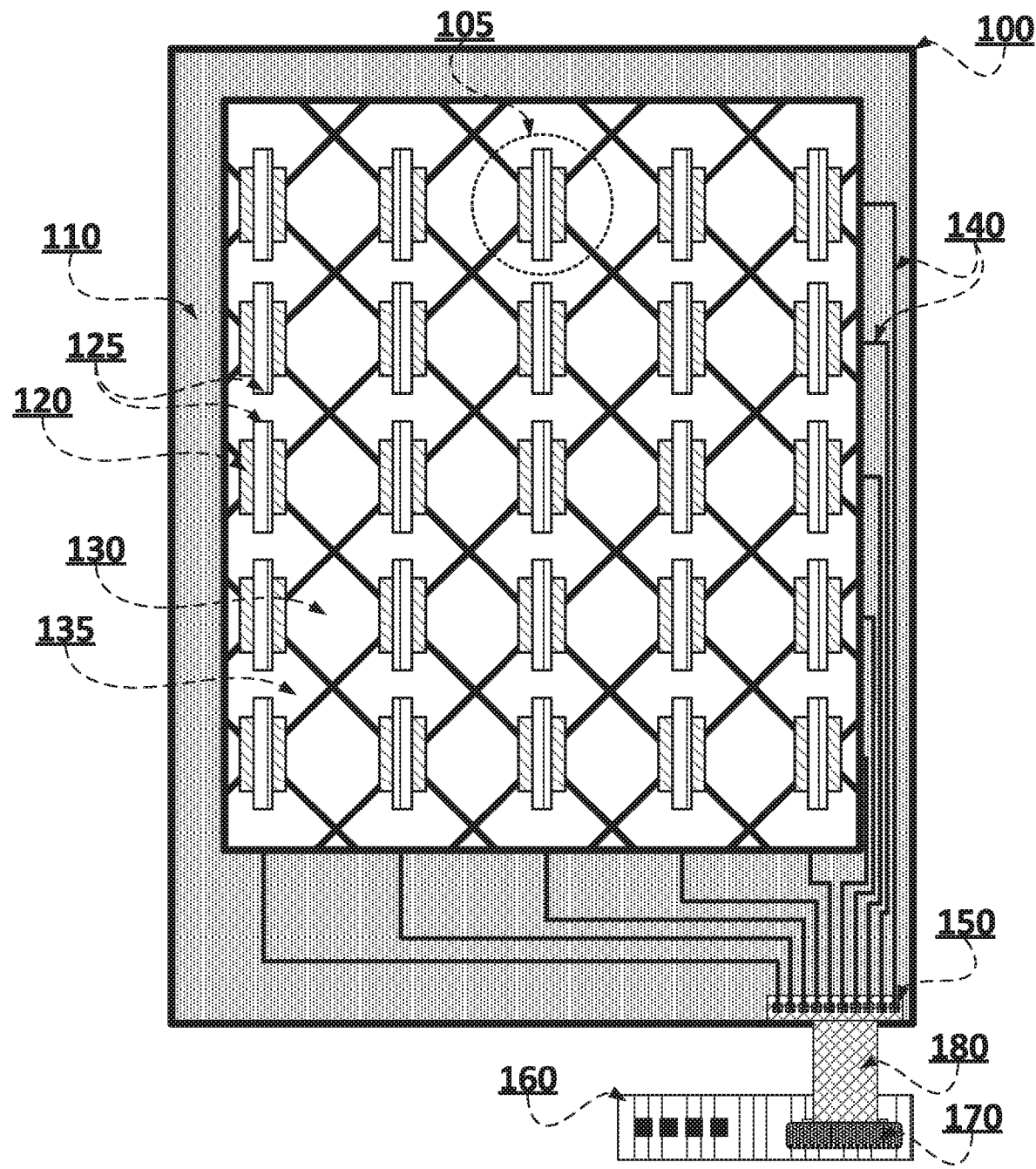
FIG. 1 is a schematic plan view showing a flexible touch panel, which is connected to a driving circuit, in the related art.

A part of embodiments of the present disclosure will be described in detail below with reference to accompanying drawings, and details and functions that are not necessary for the present disclosure are omitted in the description so as to facilitate understanding the present disclosure. In the present specification, the following various embodiments for describing principles of the present disclosure are merely illustrative and should not be construed as limiting the scope of the disclosure in any manners. The following description with reference to the drawings is intended to facilitate thoroughly understanding exemplary embodiments of the present disclosure which are defined by claims and equivalents thereof. The following description may include numerous specific details to facilitate the understanding, but these details should be considered as merely exemplary. Accordingly, it will be appreciated by those skilled in the art that various changes and modifications may be made to the embodiments described herein without departing from the scope and spirit of the disclosure. In addition, descriptions of well-known functions and constructions are omitted for clarity and conciseness. In addition, the same reference numbers are used throughout the drawings for the same or similar functions, devices and/or operations. In addition, in the drawings, parts are not necessarily drawn to scale. In other words, relative sizes, lengths, and the like of the parts in the drawings do not necessarily correspond to actual scales.

In the present disclosure, the terms "include", "include" and their derivatives are meant to be inclusive and not limiting; the term "or" is inclusive, which is meant to "and/or". In addition, in the following description of the present disclosure, directional terms such as "up", "down", "left", "right", etc., are used to indicate relative positional relationships to help those skilled in the art to understand the embodiments of the present disclosure, and thus those skilled in the art should understand that "up"/"down" in one direction may become "down"/"up" in an opposite direction, and may become other positional relationships in other directions, such as "left"/"right", etc.

In this context, unless otherwise stated, an expression "integrally formed" is generally intended to mean that: two components are formed through the same one process from the point of view of process; the two components include the same material and there is no connection interface between the two components from the point of view of constituent structure, that is, the two components are uniformly and continuously formed from the same material, in other words, the two components are actually two portions of one member having a unitary structure. For example, an expression "a flexible substrate body and a flexible substrate extension are integrally formed" means that the flexible substrate body and the flexible substrate extension are uniformly and continuously formed from the same flexible material without a connection interface therebetween, that is, the flexible substrate body and the flexible substrate extension are actually two portions of a flexible substrate.

As used herein, unless otherwise indicated, an expression "same layer" is generally intended to mean that: at least two layers, patterns, elements, members or components are formed from the same material and formed on the same substrate or film layer through the same one patterning process.

As previously mentioned, in a process of manufacturing a conventional rigid touch screen which includes a glass substrate, a circuit on a touch screen body may be indirectly connected to a driving circuit of the touch screen typically through a flexible circuit board. With the development of flexible displays, flexible touch screens have also developed. However, a connection between a flexible touch screen and its driving circuit still refers to the indirect connection which is applied in a rigid substrate such as glass substrate, that is, the connection through the flexible circuit board.

For a touch screen which includes a rigid substrate such as glass substrate, the touch screen has to be indirectly connected to its driving circuit through the flexible circuit board due to a characteristic of its material, in order to maintain fabricabilities of both the touch screen and the driving circuit during subsequent manufacturing processes. Since the flexible touch screen itself is capable of being bent and folded to a high extent, it is not necessary to use the flexible circuit board to connect with the driving circuit. In other words, at present, the flexible touch screen is still connected to its driving circuit through the flexible circuit board, but in fact, the flexible touch screen itself is capable of being bent and folded, thus a manner in which the flexible touch screen is still connected to the driving circuit through the flexible circuit board not only increases steps of the manufacturing process, but also wastes the flexible circuit board.

FIG. 1 is a schematic plan view showing a flexible touch panel 100, which is connected to a driving circuit 160, in the related art. As shown in FIG. 1, the flexible touch panel 100 may include a flexible substrate 110 and a plurality of touch units 105 disposed on the flexible substrate 110. Each flexible touch unit 105 may include electrode patterns 130/135, a conductive bridge 125, and an insulating protective layer 120.

In the embodiment shown in FIG. 1, a single-layer ITO (i.e., Indium Tin Oxide) mutual capacitance touch screen design is employed, wherein each flexible touch unit 105 may include a transmitting electrode (also called driving electrode) 130 and a receiving electrode (also called sensing electrode) 135 that are disposed in the same layer and insulated from each other. In the embodiment shown in FIG. 1, each of the transmitting electrode 130 and the receiving electrode 135 has a substantially diamond-shaped electrode pattern. Moreover, transmitting electrodes 130 in the same row are electrically connected to one another and electrically connected to a signal line 140 disposed at a frame of the flexible touch panel 100, and receiving electrodes 135 in the same column are spaced apart by the transmitting electrodes 130 disposed in the same layer and are electrically connected with one another through the conductive bridges 125. The insulating protective layer 120 (for example, an optical transparent adhesive OCA) is further disposed between the conductive bridges 125 and the transmitting electrodes 130 to prevent the transmitting electrodes 130 and the receiving electrodes 135 from being short-circuited. Further, the receiving electrodes 135 in the same column are also electrically connected to a signal line 140 disposed at the frame of the flexible touch panel 100. With such an arrangement, a mutual capacitance may be generated between the transmitting electrodes 130 and the receiving electrodes 135 (near an intersection point therebetween) under an action of driving signals on the signal lines 140 connected to the transmitting electrodes 130, and thus an induced current may be generated in the receiving electrodes 135. When an object such as a human finger or a stylus approaches the intersection point, the mutual capacitance is changed, so that the induced current generated in the receiving electrodes 135 is changed, and further the induced current is transmitted to the driving circuit 160 through the signal lines 140 connected to the receiving electrodes 135, and thus is sensed. As a result, various touch operations of the object on the flexible touch panel 100 may be accurately determined based on processed signals of the driving circuit 160.

Further, a black matrix may be disposed at the frame of a substrate 110 of the flexible touch panel 100, so that circuits, signal lines and the like in a non-display area at the frame are not visible from outside, and the circuits and the signal lines are protected.

As described above, in order to electrically connect the flexible touch panel 100 with its driving circuit (hereinafter sometimes abbreviated as PCB) 160, it is generally necessary to provide a flexible circuit board (hereinafter sometimes abbreviated as FPC) 180 between the flexible touch panel 100 and its driving circuit 160. On one hand, the flexible circuit board 180 is bonded to respective signal lines 140 at a bonding area 150, on the other hand, the flexible circuit board 180 is connected to the driving circuit 160 through PCB/FPC interfaces 170 on the driving circuit 160, thereby realizing an electrical connection between the flexible touch panel 100 and its driving circuit 160.

However, as described above, the flexible touch panel 100 itself is capable of being bent and folded, thus a manner in which the flexible touch panel 100 is still connected to the driving circuit 160 through the flexible circuit board 180 not only increases steps of the manufacturing process, but also wastes the flexible circuit board 180. Therefore, in order to at least partially solve or alleviate the above defect, embodiments of the present disclosure provide a flexible touch panel, a method of manufacturing the flexible touch panel, and a flexible touch display including the flexible touch panel.

Figure 2A:
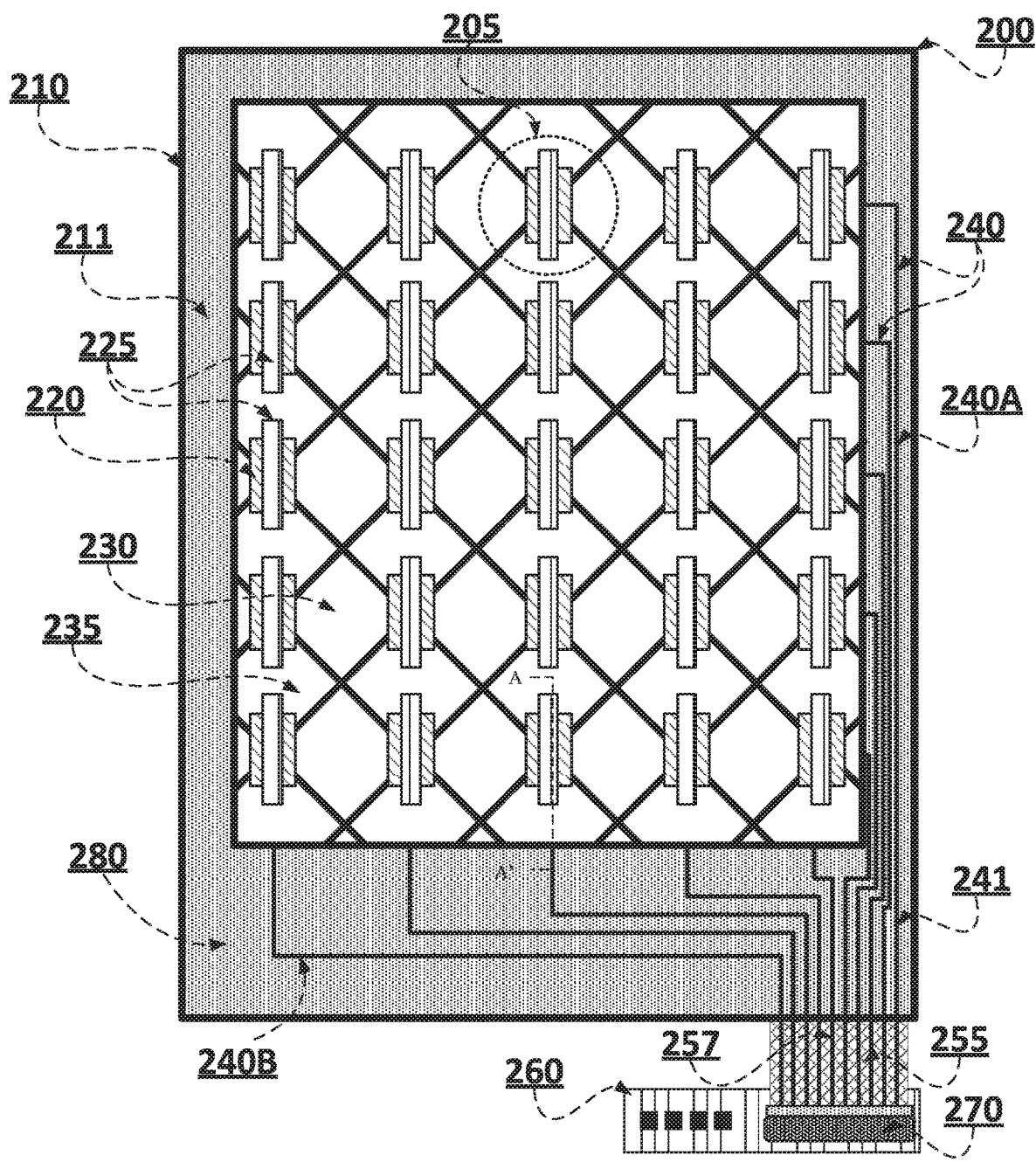
FIG. 2A is a schematic plan view showing a flexible touch panel, which is connected to a driving circuit, according to some embodiments of the present disclosure.

FIG. 2A is a schematic plan view showing a flexible touch panel 200, which is connected to a driving circuit 260, according to some embodiments of the present disclosure. As shown in FIG. 2A, the flexible touch panel 200 may include a flexible substrate 210 and a plurality of touch units 205 disposed on the flexible substrate 210. Each flexible touch unit 205 may include electrode patterns 230/235, a conductive bridge 225, and an insulating protective layer 220.

It should be noted that, since the driving circuit 260 is generally disposed outside the flexible substrate 210 of the flexible touch panel 200, the driving circuit 260 is also referred to as an external driving circuit.

As shown in FIG. 2A, the flexible substrate 210 may include a first portion and a second portion. The first portion may be a flexible substrate body 211, and the second portion may be a flexible substrate extension 255. The flexible substrate body 211 and the flexible substrate extension 255 are integrally formed.

The flexible substrate 210 may include one flexible substrate body 211 and at least one flexible substrate extension 255. For example, in the embodiments shown in FIG. 2A, the flexible substrate 210 includes one flexible substrate extension 255. Optionally, the flexible substrate extension 255 may be disposed on a side of the flexible substrate body 211 proximate to the driving circuit 260, that is, the flexible substrate extension 255 may be disposed on a side of the flexible substrate body 211 facing the driving circuit 260. As shown in FIG. 2A, one flexible substrate extension 255 is disposed on a lower side of the flexible substrate body 211.

An area of an orthographic projection of the flexible substrate extension 255 in a direction perpendicular to the flexible substrate 210 may be much smaller than an area of an orthographic projection of the flexible substrate body 211 in the direction perpendicular to the flexible substrate 210, for example, a ratio of the area of the orthographic projection of the flexible substrate extension 255 in the direction perpendicular to the flexible substrate 210 to the area of the orthographic projection of the flexible substrate body 211 in the direction perpendicular to the flexible substrate 210 may be in a range of 1/20 to 1/5.

In the embodiments shown in FIG. 2A, a single layer ITO (Indium Tin Oxide) mutual capacitance touch screen design may be employed, for example. However, the present disclosure is not limited thereto. In fact, the present disclosure is equally applicable to other types of flexible touch screen designs, including but not limited to: dual-layer ITO mutual capacitance touch screen design, self-capacitance touch screen design, and the like. In other words, technical solutions of the embodiments of the present disclosure are applicable to any scene in which a flexible function panel needs to be electrically connected to another external circuit.

For example, each of the flexible touch units 205 may include a first electrode 230 and a second electrode 235 that are disposed in the same layer and insulated from each other. In the embodiments shown in FIG. 2A, each of the first electrode 230 and the second electrode 235 has a substantially diamond-shaped electrode pattern. However, the present disclosure is not limited thereto, and electrode patterns of any shape may be employed, including but not limited to: rectangle, strip, triangle, cross, and the like.

It should be noted that, the first electrode may be one of a transmitting electrode (also referred to as driving electrode) and a receiving electrode (also referred to as sensing electrode), and the second electrode may be the other one of the transmitting electrode (also referred to as driving electrode) and the receiving electrode (also referred to as sensing electrode). Hereinafter, for the convenience of description, the embodiments of the present disclosure will be described in detail by taking an example in which the first electrode is the transmitting electrode and the second electrode is the receiving electrode. Those skilled in the art should understand that the embodiments of the present disclosure are not limited thereto.

As shown in FIG. 2A, a plurality of transmitting electrodes 230 and a plurality of receiving electrodes 235 may be arranged in an array on the flexible substrate body 211, for example, the plurality of transmitting electrodes 230 may be arranged in rows on the flexible substrate body 211, the plurality of receiving electrodes 235 may be arranged in columns on the flexible substrate body 211, and the plurality of transmitting electrodes 230 and the plurality of receiving electrodes 235 may be located in the same layer.

Figure 2B:
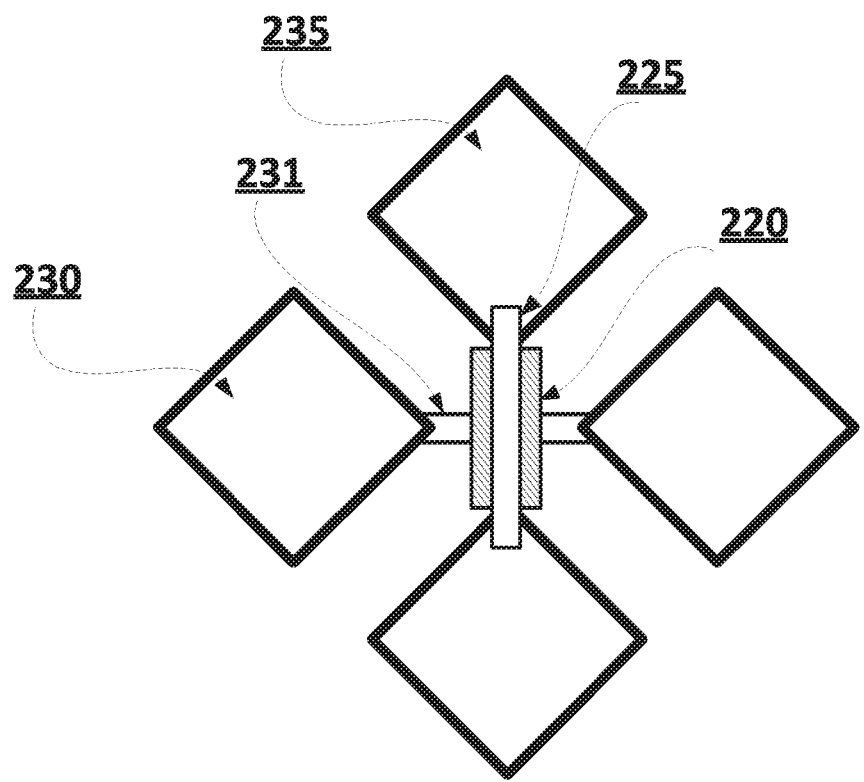
FIG. 2B is an enlarged view of a touch unit of the flexible touch panel shown in FIG. 2A.
Figure 2C:
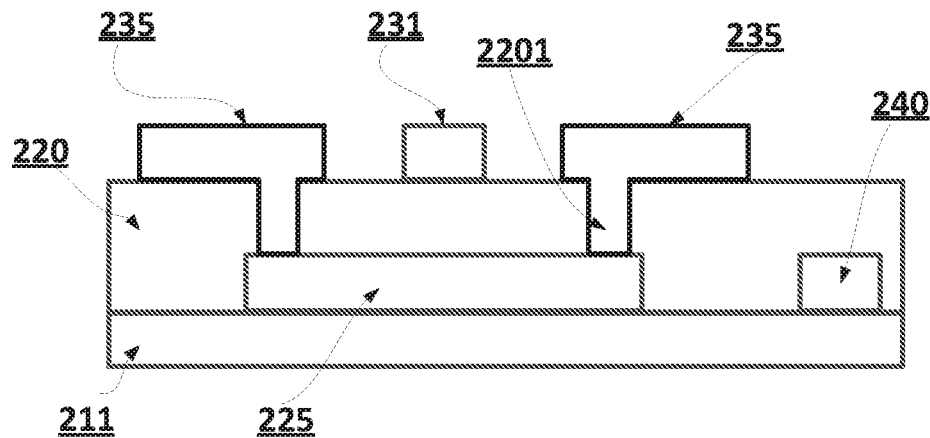
FIG. 2C is a partial cross-sectional view taken along line AA' in FIG. 2A, schematically showing an electrode arrangement in a flexible touch panel according to some embodiments of the present disclosure.

FIG. 2B is an enlarged view of the touch unit 205 shown in FIG. 2A, and FIG. 2C is a partial cross-sectional view taken along line AA' in FIG. 2A. Referring to FIGS. 2A, 2B, and 2C, the plurality of transmitting electrodes 230 are disposed on the flexible substrate body 211 and spaced apart from one another, and the plurality of receiving electrodes 235 are disposed on the flexible substrate body 211 and spaced apart from one another. The transmitting electrodes 230 located in the same row may be electrically connected to one another through conductive portions 231. The receiving electrodes 235 located in the same column may be electrically connected to one another through conductive bridges 225. As shown in FIG. 2C, the conductive bridges 225 may be located in the same layer as the signal lines 240 (which will be described in detail below), and the conductive portions 231 may be located in the same layer as both the transmitting electrodes 230 and the receiving electrodes 235, and the insulating protective layer 220 is disposed between a layer where the conductive bridges 225 are located and a layer where the transmitting electrodes 230 are located. A conductive plug 2201 is formed in the insulating protective layer 220. One end of the conductive plug 2201 is connected to the receiving electrode 235, and the other end thereof is connected to the conductive bridge 225. In this way, two adjacent receiving electrodes 235 are electrically connected to each other through the conductive bridge 225.

As shown in FIG. 2A, the flexible touch panel 200 may further include a plurality of signal lines 240 at its frame. Each of the signal lines 240 may include a first portion 241 disposed on the flexible substrate body 211 and a second portion 257 disposed on the flexible substrate extension 255. It should be noted that, since the second portion 257 of the signal line is disposed on the flexible substrate extension 255, the second portion 257 of the signal line is also referred to as a signal line extension 257 herein.

For example, the plurality of signal lines 240 may include a first signal line 240A and a second signal line 240B. The first signal line 240A may electrically connect the transmitting electrode 230 to the driving circuit 260, and the second signal line 240B may electrically connect the receiving electrode 235 to the driving circuit 260. As shown in FIG. 2A, each of the first signal line 240A and the second signal line 240B may include a first portion 241 disposed on the flexible substrate body 211 and a second portion 257 disposed on the flexible substrate extension 255.

In this way, the transmitting electrodes 230 in the same row are electrically connected to one another and electrically connected to the signal line 240 disposed at the frame of the flexible touch panel 200, and the plurality of receiving electrodes 235 in the same column are spaced apart by the transmitting electrodes 230 disposed in the same layer and electrically connected to one another through the conductive bridges 225, and the insulating protective layer 220 (for example, an optical transparent adhesive OCA) is further disposed between the conductive bridges 225 and the transmitting electrodes 230 to prevent the transmitting electrodes 230 and the receiving electrodes 235 from being short-circuited. Moreover, the receiving electrodes 235 in the same column are also electrically connected to the signal lines 240 at the frame of the flexible touch panel 200. With such an arrangement, a mutual capacitance may be generated between the transmitting electrodes 230 and the receiving electrodes 235 (near an intersection point therebetween) under an action of driving signals on the signal lines 240 connected to the transmitting electrodes 230, and thus an induced current may be generated in the receiving electrodes 235. When an object such as a human finger or a stylus approaches the intersection point, the mutual capacitance is changed, so that the induced current generated in the receiving electrodes 235 is changed, and further the induced current is transmitted to the driving circuit 260 through the signal lines 240 connected to the receiving electrodes 235, and thus is sensed. As a result, various touch operations of the object on the flexible touch panel 200 may be accurately determined based on processing signals of the driving circuit 260.

Referring to FIG. 2C, the signal line 240 may be in the same layer as the conductive bridge 225. For example, both the signal line 240 and the conductive bridge 225 may be formed from metal materials such as copper, silver, or the like, and they may be formed through the same patterning process.

It should be noted that, the arrangement of the transmitting electrodes 230 and the receiving electrodes 235 is not limited to the above embodiments. For example, the transmitting electrodes 230 may be arranged in columns and the receiving electrodes 235 may be arranged in rows, that is, aforementioned connections of both the transmitting electrodes 230 and the receiving electrodes 235 to the signal lines 240 may be exchanged. Moreover, in a multi-layer arrangement, the transmitting electrodes 230 and the receiving electrodes 235 may be arranged in two layers, respectively, and thus it is not necessary to employ the conductive bridge 225. In addition, in the present embodiments, the conductive bridge 225 may employ a metal conductive bridge such as copper, silver, or the like, however, the present disclosure are not limited thereto. In fact, the conductive bridge 225 itself may also employ a metal oxide such as ITO or other conductive material, in such a case, it is only required to adjust a process of manufacturing the conductive bridge 225 and/or the flexible touch unit 205, accordingly.

Figure 2D:
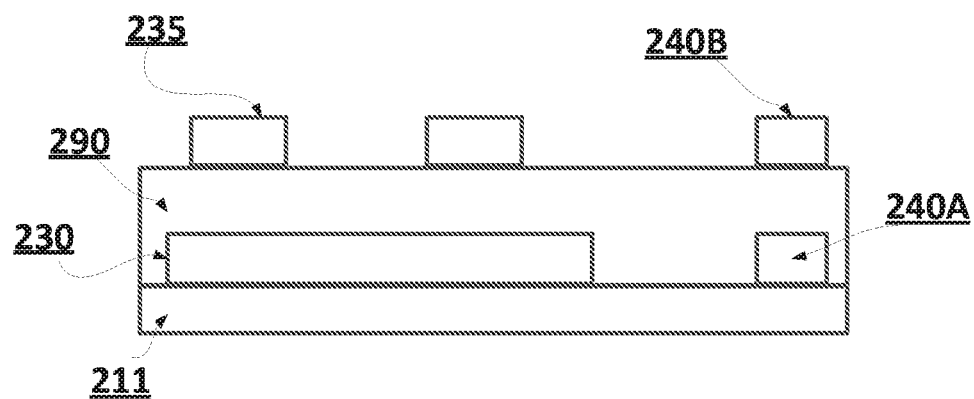
FIG. 2D is a schematic view schematically showing an electrode arrangement in a flexible touch panel according to some other embodiments of the present disclosure.

Referring to FIG. 2D, the transmitting electrodes 230 and the receiving electrodes 235 may be disposed on the flexible substrate body 211 in two layers, and a film layer 290 is disposed between the transmitting electrodes 230 and the receiving electrodes 235. For example, the plurality of signal lines 240 may also include a first signal line 240A and a second signal line 240B. The first signal line 240A may electrically connect the transmitting electrodes 230 with the driving circuit 260, and the second signal line 240B may electrically connect the receiving electrodes 235 with the driving circuit 260. As shown in FIG. 2A, each of the first signal line 240A and the second signal line 240B may include a first portion 241 disposed on the flexible substrate body 211 and a second portion 257 disposed on the flexible substrate extension 255. As shown in FIG. 2D, the first signal line 240A electrically connected to the transmitting electrodes 230 may be located in the same layer as the transmitting electrodes 230, and the second signal line 240B electrically connected to the receiving electrodes 235 may be located in the same layer as the receiving electrode 235.

Further, a black matrix 280 may be disposed at the frame of the substrate 210 of the flexible touch panel 200 such that circuits, signal lines and the like in the non-display area at the frame are not visible from outside and these circuits and signal lines are protected. It should be noted that, in FIG. 2A, for the substrate 210 as a bottom layer, its back face is actually a face which is visible by the user of the touch display, that is, the back face is a display face, and the face shown in FIG. 2A is actually behind the display face of the touch display. Therefore, due to shielding of the frame in which the black matrix is disposed, the circuits, the signal lines and the like located in these areas in FIG. 2A are virtually invisible, thereby obtaining a product with a beautiful appearance. It should be noted that, unless otherwise stated, a "display face" of a substrate, panel or display generally refers to a face of the substrate, panel or display that faces the user during normal use; a "back face" of a substrate, panel or display generally refers to a face of the substrate, panel or display that faces away from the user during normal use.

It should be noted that, in the embodiments, the black matrix 280 is formed at the frame of the flexible substrate body 211, and it is not necessary to form a black matrix on the flexible substrate extension 255 as the flexible substrate extension 255 and the extension 257 thereon will be bent to the back side of the flexible substrate 210 so as to be shielded by the black matrix frame. Therefore, as shown in FIG. 2A, the flexible substrate body 211 and the flexible substrate extension 255 are indicated by different hatching lines.

Different from the embodiment shown in FIG. 1, the connection between the flexible touch panel 200 and the driving circuit 260 is realized without using a flexible circuit board (FPC), and it is realized by means of a flexibility of the flexible touch panel 200 itself. For example, by means of the flexible substrate extension 255 adjacent to the body (or main body, which may correspond to the flexible substrate 110 shown in FIG. 1) of the flexible substrate 210 and the signal line extensions 257 which are disposed on the flexible substrate extension 255 and are directly connected with the interfaces 270 of the driving circuit 260, the connection between the flexible touch panel 200 and the driving circuit 260 is realized.

As shown in FIG. 1, in the related art, a projection of the flexible circuit board 180 in the direction perpendicular to the flexible substrate 110 overlaps with a projection of the flexible substrate 110 in the direction perpendicular to the flexible substrate 110 and a bonding region 150 is formed in the overlapped region so as to realize an electrical connection between lines on the flexible circuit board 180 and the signal lines on the flexible substrate 110. In comparison, in the embodiments illustrated in FIG. 2A, the flexible substrate body 211 is contiguous with the flexible substrate extension 255, for example, a side face of the flexible substrate body 211 facing the flexible substrate extension 255 is opposite to and contacts a side face of the flexible substrate extension 255 facing the flexible substrate body 211, however, an orthographic projection of the flexible substrate extension 255 in the direction perpendicular to the flexible substrate 210 does not overlap with an orthographic projection of the flexible substrate body 211 in the direction perpendicular to the flexible substrate 210, such that the signal line 240 may directly extend from a first position on the flexible substrate body 211 to a second position on the flexible substrate extension 255 so as to directly electrically connect the touch unit 205 with the driving circuit 260 without using a flexible circuit board.

By using such a design of the signal line on the touch panel, the flexible touch screen may be directly connected to its driving circuit. In the case by using the design, the connection between the flexible touch screen and the driving circuit may be realized even if the flexible circuit board is not used, thereby reducing the manufacturing processes of the touch module, reducing equipment and personnel investment, and avoiding using the flexible circuit board. As a result, an efficiency is improved, production costs are saved and product competitiveness is improved.

Figure 5:
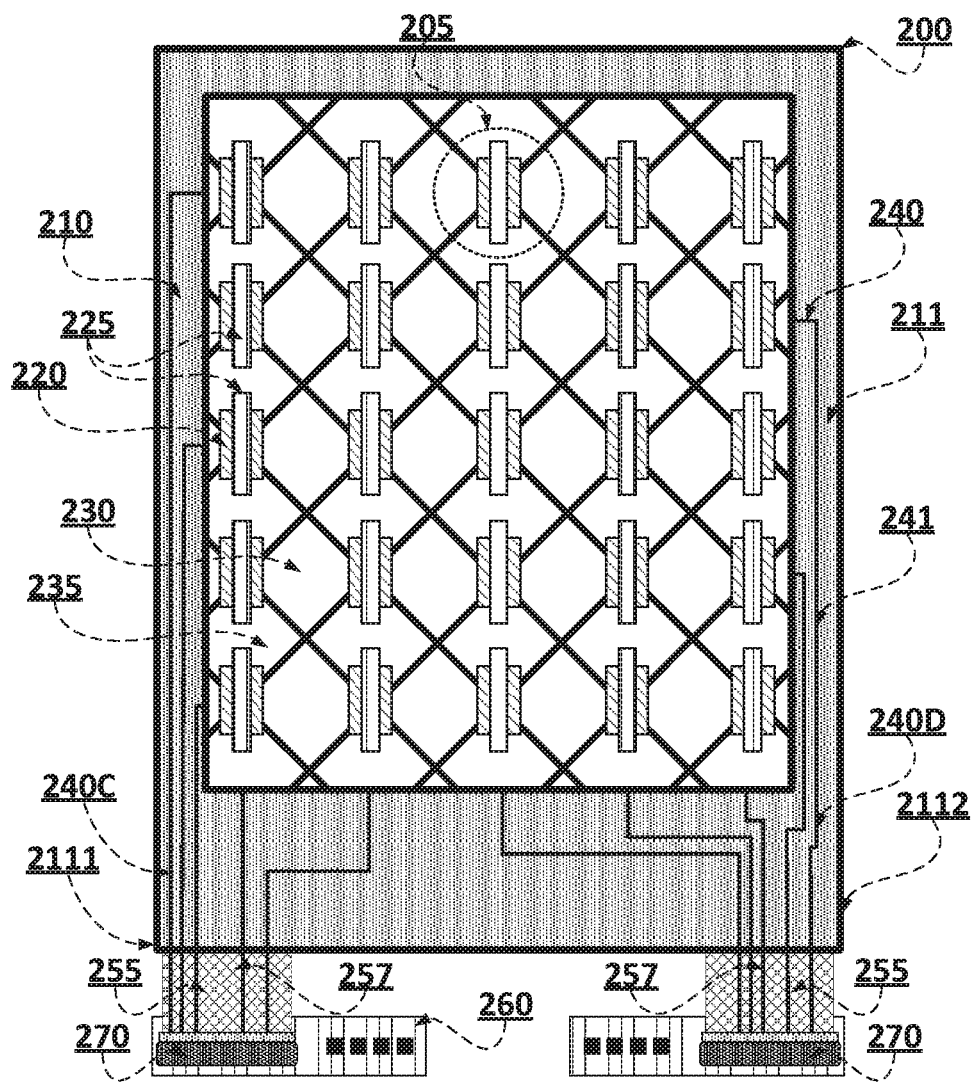
FIG. 5 is a schematic plan view showing a flexible touch panel, which is connected to a driving circuit, according to some embodiments of the present disclosure.

FIG. 5 is a schematic plan view showing a flexible touch panel 200, which is connected to a driving circuit 260, according to some embodiments of the present disclosure. As shown in FIG. 5, the flexible touch panel 200 may include a flexible substrate 210 and a plurality of touch units 205 disposed on the flexible substrate 210. Each flexible touch unit 205 may include electrode patterns 230/235, a conductive bridge 225, and an insulating protective layer 220. Hereinafter, differences between the embodiments shown in FIG. 5 and the embodiments shown in FIG. 2A will be mainly described, and other structures in the embodiments shown in FIG. 5 may refer to the above descriptions with respect to FIGS. 2A-2C.

As shown in FIG. 5, the flexible substrate 210 may include a first portion and a second portion. The first portion is a flexible substrate body 211, and the second portion is a flexible substrate extension 255. The flexible substrate body 211 and the flexible substrate extension 255 are integrally formed.

In the embodiments of FIG. 5, the flexible substrate 210 includes two flexible substrate extensions 255. Optionally, the two flexible substrate extensions 255 may be disposed on a side of the flexible substrate body 211 proximate to the driving circuit 260, that is, the two flexible substrate extensions 255 may be disposed on a side of the flexible substrate body 211 facing the driving circuit 260. As shown in FIG. 5, the two flexible substrate extensions 255 are disposed on the lower side of the flexible substrate body 211, wherein one flexible substrate extension 255 is adjacent to one side edge 2111 (left side edge in FIG. 5) of the flexible substrate body 211, and the other one flexible substrate extension 255 is adjacent to the other opposite side edge 2112 (right side edge in FIG. 5) of the flexible substrate body 211. Herein, for convenience of description, the flexible substrate extension 255 adjacent to the left side edge of the flexible substrate body 211 is referred to as a first flexible substrate extension 255, and the flexible substrate extension 255 adjacent to the right side edge of the flexible substrate body 211 is referred to as a second flexible substrate extension 255.

An area of an orthographic projection of each of the flexible substrate extensions 255 in the direction perpendicular to the flexible substrate 210 may be much smaller than the area of the orthographic projection of the flexible substrate body 211 in the direction perpendicular to the flexible substrate 210, for example, a ratio of the area of the orthographic projection of each of the flexible substrate extensions 255 in the direction perpendicular to the flexible substrate 210 to the area of the orthographic projection of the flexible substrate body 211 in the direction perpendicular to the flexible substrate 210 may be in a range of 1/40 to 1/5.

As shown in FIG. 5, the flexible touch panel 200 may further include a plurality of signal lines 240 at its frame. Each signal line 240 may include a first portion 241 disposed on the flexible substrate body 211 and a second portion 257 disposed on the flexible substrate extension 255. For example, a part of the signal lines 240 may be disposed adjacent to the left side edge of the flexible substrate 210 to electrically connect the transmit electrodes 230 located in odd rows to the driving circuit 260 disposed on the flexible substrate extension 255 at the left side edge, and a part of the signal lines 240 may be disposed adjacent to the right side edge of flexible substrate 210 to electrically connect the transmit electrodes 230 located in even rows to the driving circuit 260 disposed on the flexible substrate extension 255 at the right side edge. In this way, not only a difficulty of arranging the signal lines is reduced, but also an occupying area of the signal lines on one side of the frame of the flexible substrate may be reduced, which is advantageous for realizing a display panel with a narrow frame.

For example, the plurality of signal lines 240 may include a third signal line 240C and a fourth signal line 240D, the third signal line 240C includes a first portion 241 disposed on the flexible substrate body 211 and a second portion 257 disposed on the first flexible substrate extension 255, and the fourth signal line 240D includes a first portion 241 disposed on the flexible substrate body 211 and a second portion 257 disposed on the second flexible substrate extension 255.

It should be understood that the embodiments shown in FIG. 5 have all the advantages of the embodiments shown in FIGS. 2A-2C, and details are not described herein again.

Figure 6:
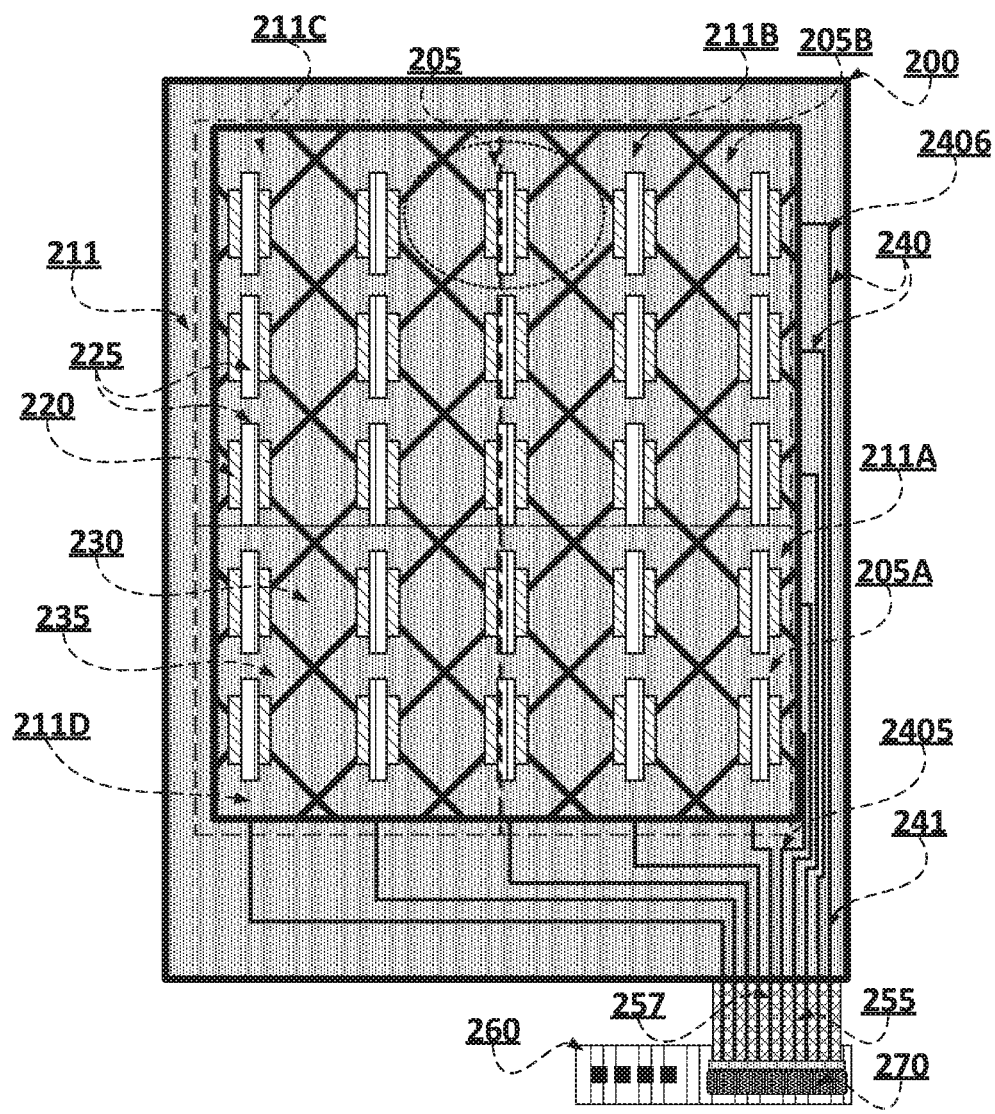
FIG. 6 is a schematic plan view showing a flexible touch panel, which is connected to a driving circuit, according to some embodiments of the present disclosure.

FIG. 6 is a schematic plan view showing a flexible touch panel 200, which is connected to a driving circuit 260, according to some embodiments of the present disclosure. As shown in FIG. 6, the flexible touch panel 200 may include a flexible substrate 210 and a plurality of touch units 205 disposed on the flexible substrate 210. Each touch unit 205 may include electrode patterns 230/235, a conductive bridge 225, and an insulating protective layer 220. Hereinafter, differences between the embodiments shown in FIG. 6 and the embodiments shown in FIG. 2A and FIG. 5 will be mainly described, and other structures in the embodiments shown in FIG. 6 may refer to the above descriptions with respect to FIGS. 2A-2C and FIG. 5.

As shown in FIG. 6, the flexible substrate 210 may include a first portion and a second portion. The first portion is a flexible substrate body 211, and the second portion is a flexible substrate extension 255. The flexible substrate body 211 and the flexible substrate extension 255 are integrally formed.

Each of the touch units 205 may include a transmitting electrode 230 and a receiving electrode 235 that are disposed in the same layer and insulated from each other. The flexible touch panel 200 may further include a plurality of signal lines 240 at its frame. For example, each of the signal lines 240 may electrically connect the transmitting electrode 230 or the receiving electrode 235 of one touch unit 205 to the driving circuit 260. As shown in FIG. 6, each of the signal lines 240 may include a first portion 241 disposed on the flexible substrate body 211 and a second portion 257 disposed on the flexible substrate extension 255.

Some of the touch units 205 may be located at a position distal to the driving circuit 260, that is, at a position distal to the flexible substrate extension 255. Some other of the touch units 205 may be located at a position proximate to the driving circuit 260, that is, at a position proximate to the flexible substrate extension 255. For example, in the embodiments shown in FIG. 6, the flexible substrate extension 255 and the driving circuit 260 are located at a lower right corner of the flexible substrate, then some of the touch units 205 which are located in a lower right region (for example, a region defined by a dashed box 211A in FIG. 6) of the flexible substrate body 211 may be considered as being proximate to the driving circuit 260 and the flexible substrate extension 255, and some other of the touch units 205 which are located in a left region and/or an upper region (for example, regions defined by dashed boxes 211B, 211C, 211D in FIG. 6) of the flexible substrate body 211 may be considered as being distal to the driving circuit 260 and the flexible substrate extension 255. In such a case, for convenience of description, the touch units 205 which are proximate to the driving circuit 260 and the flexible substrate extension 255 may be referred to as first touch units 205, and the touch units 205 which are distal to the driving circuit 260 and the flexible substrate extension 255 may be referred to as second touch units 205. It should be understood that, expressions "distal to" and "proximate to" herein may have relative concepts, if one touch unit is more proximate to the driving circuit 260 and the flexible substrate extension 255 than another touch unit, then the one touch unit may be referred to as the first touch unit and the another touch unit may be referred to as the second touch unit.

As the first touch unit 205A is more proximate to the driving circuit 260 or the flexible substrate extension 255 than the second touch unit 205B, a length of the signal line 240 which electrically connect the first touch unit 205A to the driving circuit 260 is less than a length of the signal line 240 which electrically connect the second touch unit 205B to the driving circuit 260. Here, for convenience of description, the signal line 240 which electrically connect the first touch unit 205A to the driving circuit 260 may be referred to as a fifth signal line 2405, and the signal line 240 which electrically connect the second touch unit 205B to the driving circuit 260 may be referred to as a sixth signal line 2406. As shown in FIG. 6, the length of the fifth signal line 2405 is less than the length of the sixth signal line 2406.

Optionally, in the embodiments of the present disclosure, materials for forming the signal lines 240 are related to the lengths of the signal lines, respectively. Specifically, since the length of the fifth signal line 2405 is different from the length of the sixth signal line 2406, the fifth signal line 2405 may be formed from a material different from the sixth signal line 2406. For example, an electrical resistivity of the material for forming the fifth signal line 2405 is different from an electrical resistivity of the material for forming the sixth signal line 2406. More specifically, the electrical resistivity of the material for forming the fifth signal line 2405 may be larger than the electrical resistivity of the material for forming the sixth signal line 2406. As an example, the fifth signal line 2405 may be formed from conductive materials such as ITO (Indium Tin Oxide), and the sixth signal line 2406 may be formed from metal conductive materials such as copper, silver or the like. In the embodiments, the length of the fifth signal line 2405 is less than the length of the sixth signal line 2406, and the electrical resistivity of the material for forming the fifth signal line 2405 may be larger than the electrical resistivity of the material for forming the sixth signal line 2406, so that a voltage drop due to resistance (i.e., IR drop) on the fifth signal line 2405 may be substantially consistent with an IR drop on the sixth signal line 2406. In this way, signals transmitted to respective touch units or output from respective touch units may be kept consistent with each other.

Figure 7:
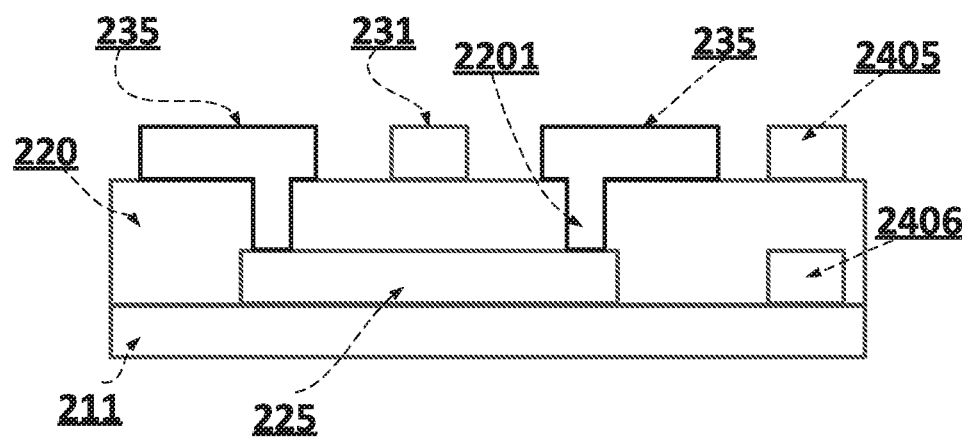
FIG. 7 is a schematic view schematically showing an electrode and signal line arrangement in a flexible touch panel according to some embodiments of the present disclosure.

Referring to FIG. 6 and FIG. 7, the fifth signal line 2405 may be located in the same layer as the transmitting electrodes 230, the receiving electrodes 235 and the conductive portions 231. For example, the fifth signal line 2405, the transmitting electrodes 230, the receiving electrodes 235 and the conductive portions 231 may all be formed from conductive materials such as ITO (Indium Tin Oxide), and they may be formed through the same one patterning process. The sixth signal line 2406 may be located in the same layer as the conductive bridges 225. For example, the sixth signal line 2406 and the conductive bridges 225 may both be formed from metal conductive materials such as copper, silver or the like, and they may be formed through the same one patterning process.

Figure 8:
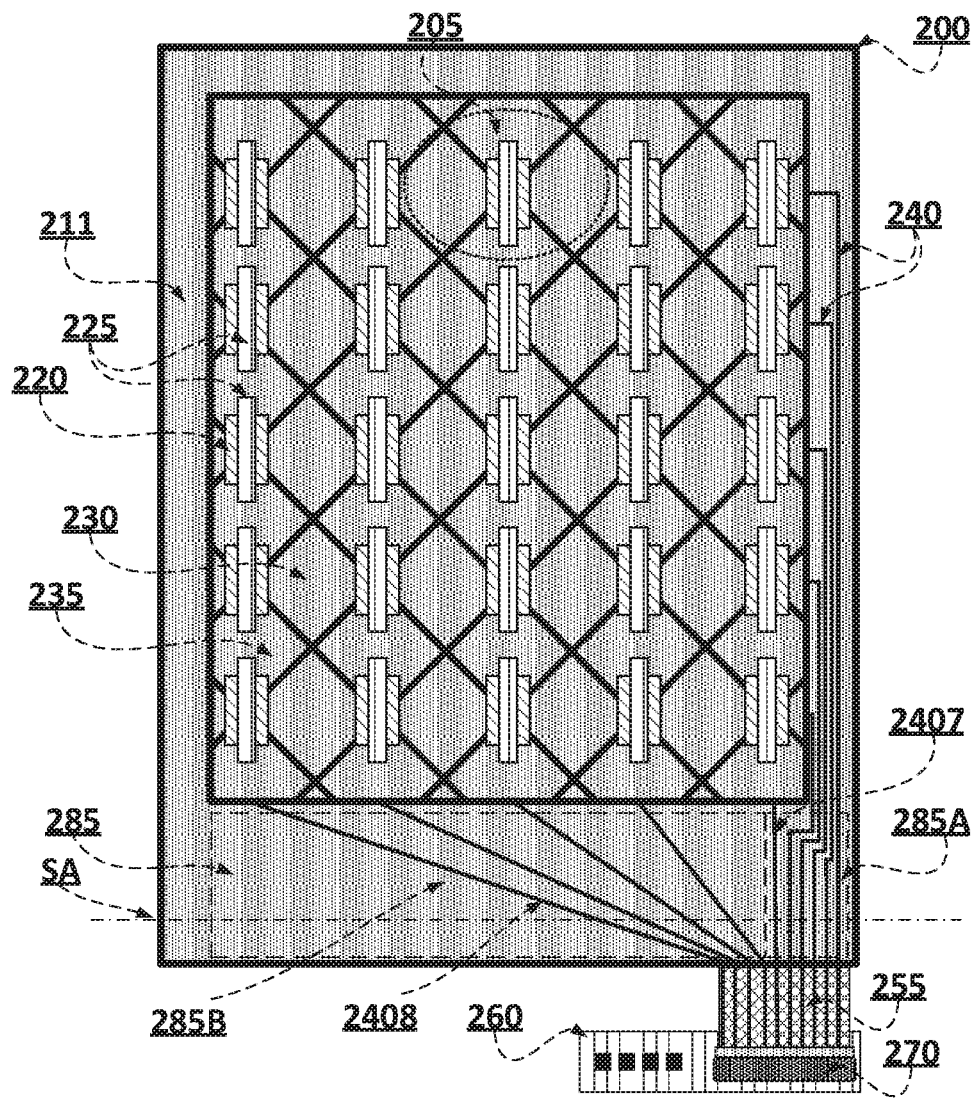
FIG. 8 is a schematic plan view showing a flexible touch panel, which is connected to a driving circuit, according to some embodiments of the present disclosure.

FIG. 8 is a schematic plan view showing a flexible touch panel 200, which is connected to a driving circuit 260, according to some embodiments of the present disclosure. As shown in FIG. 8, the flexible touch panel 200 may include a flexible substrate 210 and a plurality of touch units 205 disposed on the flexible substrate 210. Each touch unit 205 may include electrode patterns 230/235, a conductive bridge 225, and an insulating protective layer 220. Hereinafter, differences between the embodiments shown in FIG. 8 and the embodiments shown in FIG. 2A, FIG. 5 and FIG. 6 will be mainly described, and other structures in the embodiments shown in FIG. 8 may refer to the above descriptions with respect to FIGS. 2A-2C, FIG. 5 and FIG. 6.

As shown in FIG. 8, an area of an orthographic projection of the flexible substrate extension 255 in the direction perpendicular to the flexible substrate 210 may be much smaller than an area of an orthographic projection of the flexible substrate body 211 in the direction perpendicular to the flexible substrate 210, for example, a ratio of the area of the orthographic projection of the flexible substrate extension 255 in the direction perpendicular to the flexible substrate 210 to the area of the orthographic projection of the flexible substrate body 211 in the direction perpendicular to the flexible substrate 210 may be in a range of 1/20 to 1/5. As such, as the signal lines 240 converge towards the flexible substrate extension 255 from the touch units, a fan-out region is formed, as indicated by a dashed box 285 in FIG. 8.

The flexible touch panel 200 itself may be bendable. FIG. 8 schematically shows a bending axis SA of the flexible touch panel 200. The flexible touch panel 200 may be bendable about the bending axis SA, so that the flexible substrate extension 255 and the driving circuit 260 connected thereto may be bent to the back face of the flexible substrate 210. It should be understood that the bending axis may be an imaginary axis, rather than a solid axis disposed on the flexible touch panel 200.

Figure 9:
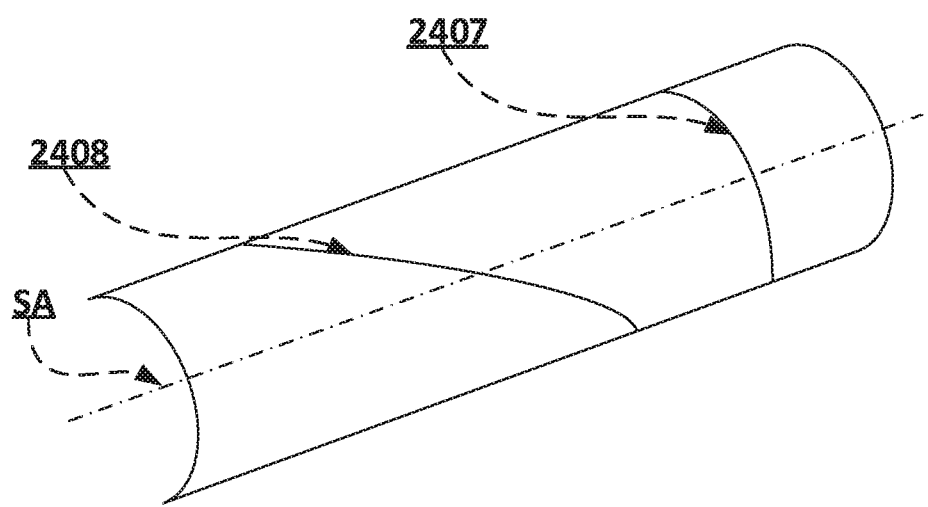
FIG. 9 is a partial enlarged view of a flexible touch panel, at a position near a bending axis, according to some embodiments of the present disclosure.

FIG. 9 is a partial enlarged view of a flexible touch panel, at a position near a bending axis, according to some embodiments of the present disclosure. Referring to FIG. 8 and FIG. 9, curved radii of the signal lines 240 at different positions of the fan-out region 285 are different. At the fan-out region 285, if an orthographic projection of one signal line 240 on the flexible substrate 210 is substantially perpendicular to an orthographic projection of the bending axis SA on the flexible substrate 210, then a curved radius of the one signal line 240 is small; if an orthographic projection of another signal line 240 on the flexible substrate 210 is at an angle less than 90° with respect to an orthographic projection of the bending axis SA on the flexible substrate 210, then a curved radius of the one signal line 240 is large. For example, referring to FIG. 8, curved radii of the signal lines 240 at first region 285A of the fan-out region 285 are small, and curved radii of the signal lines 240 at second region 285B of the fan-out region 285 are large. In such a case, for convenience of description, the signal lines 240 at the first region 285A of the fan-out region 285 may be referred to as seventh signal lines 2407, and the signal lines 240 at the second region 285B of the fan-out region 285 may be referred to as eighth signal lines 2408.

Optionally, in the embodiments of the present disclosure, materials for forming the signal lines 240 are related to the curved radii of the signal lines 240 at the fan-out region 285, respectively. Since the curved radius of the seventh signal line 2407 is different from the curved radius of the eighth signal line 2408, the seventh signal line 2407 may be formed from a material different from the eighth signal line 2408. In an example, since the curved radius of the seventh signal line 2407 is less than the curved radius of the eighth signal line 2408, a bending strength of the material for forming the seventh signal line 2407 is larger than a bending strength of the material for forming the eighth signal line 2408. For example, the seventh signal line 2407 may be formed from metal materials such as copper, silver or the like, and the eighth signal line 2408 may be formed from conductive materials such as ITO (Indium Tin Oxide). In the embodiments, the signal lines having small curved radii are formed from materials having large bending strength, such as copper, silver or the like, so as to reduce or even eliminate a case in which the signal lines are broken off when they are bent, thereby increasing a product yield.

Figure 10:
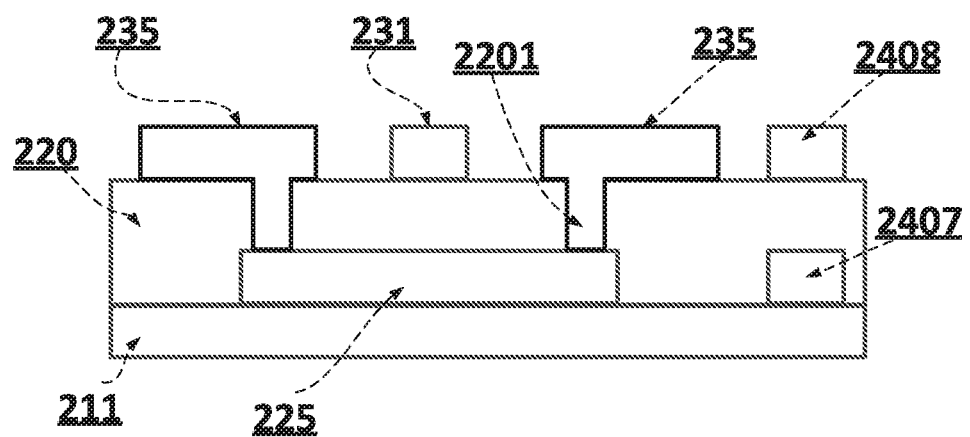
FIG. 10 is a schematic view schematically showing an electrode and signal line arrangement in a flexible touch panel according to some embodiments of the present disclosure.

Referring to FIG. 8 and FIG. 10, the eighth signal line 2408 may be located in the same layer as the transmitting electrodes 230, the receiving electrodes 235 and the conductive portions 231. For example, the eighth signal line 2408, the transmitting electrodes 230, the receiving electrodes 235 and the conductive portions 231 may all be formed from conductive materials such as ITO (Indium Tin Oxide), and they may be formed through the same one patterning process. The seventh signal line 2407 may be located in the same layer as the conductive bridges 225. For example, the seventh signal line 2407 and the conductive bridges 225 may both be formed from metal conductive materials such as copper, silver or the like, and they may be formed through the same one patterning process.

Figure 11:
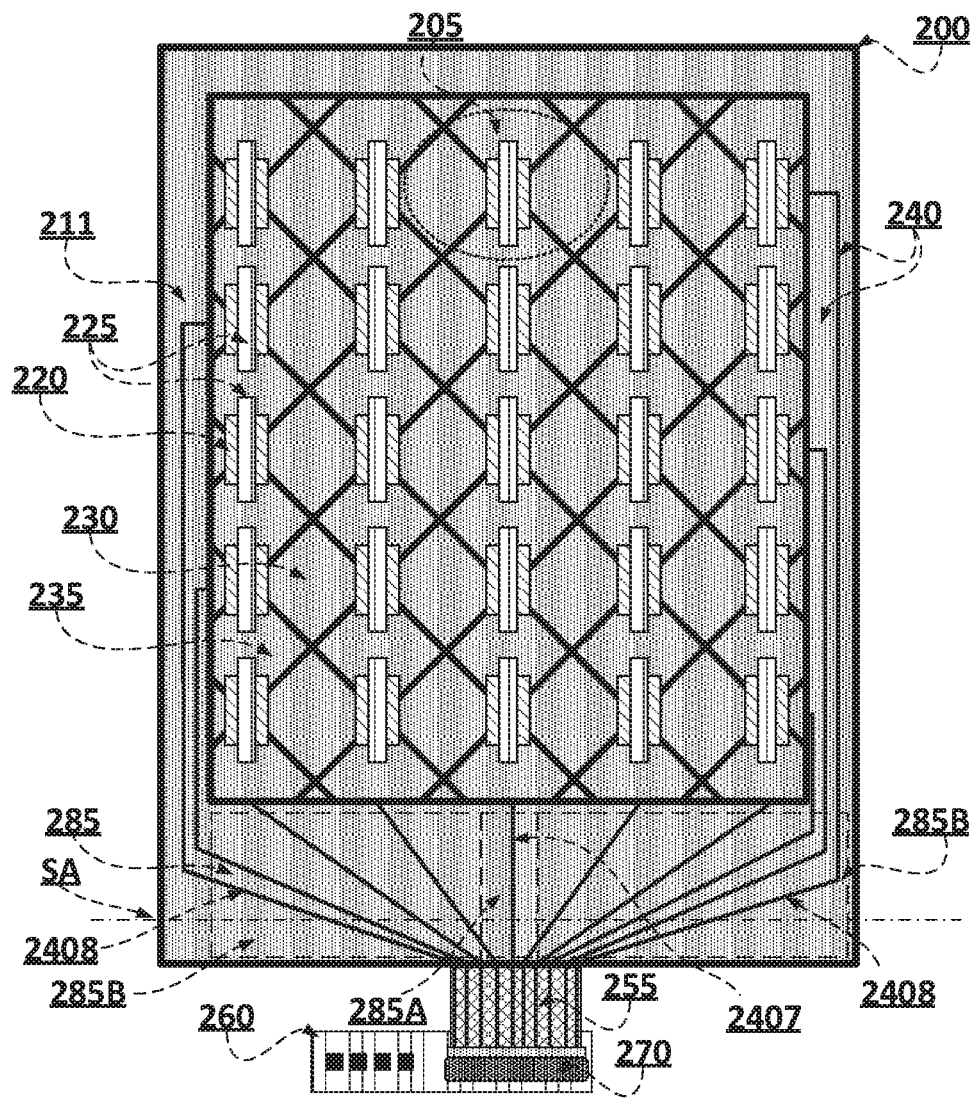
FIG. 11 is a schematic plan view showing a flexible touch panel, which is connected to a driving circuit, according to some embodiments of the present disclosure.

FIG. 11 is a schematic plan view showing a flexible touch panel 200, which is connected to a driving circuit 260, according to some embodiments of the present disclosure.

Hereinafter, differences between the embodiments shown in FIG. 11 and the embodiments shown in FIG. 8 will be mainly described, and other structures in the embodiments shown in FIG. 11 may refer to the above descriptions with respect to FIGS. 2A-2C, FIG. 5, FIG. 6 and FIG. 8.

As shown in FIG. 11, the flexible substrate extension 255 may be disposed at a middle position of a lower side of the flexible substrate body 211. An area of an orthographic projection of the flexible substrate extension 255 in the direction perpendicular to the flexible substrate 210 may be much smaller than an area of an orthographic projection of the flexible substrate body 211 in the direction perpendicular to the flexible substrate 210, for example, a ratio of the area of the orthographic projection of the flexible substrate extension 255 in the direction perpendicular to the flexible substrate 210 to the area of the orthographic projection of the flexible substrate body 211 in the direction perpendicular to the flexible substrate 210 may be in a range of 1/20 to 1/5. As such, as the signal lines 240 converge towards the flexible substrate extension 255 from the touch units, a fan-out region is formed, as indicated by a dashed box 285 in FIG. 11.

For example, referring to FIG. 11, the fan-out region 285 may include a first region 285A at the middle position and two second regions 285B at two sides of the first region 285A. curved radii of the signal lines 240 at the first region 285A of the fan-out region 285 are small, and curved radii of the signal lines 240 at the second regions 285B of the fan-out region 285 are large.

Similarly, materials for forming the signal lines 240 are related to the curved radii of the signal lines 240 at the fan-out region 285, respectively. Since the curved radius of the seventh signal line 2407 at the first region 285A is different from the curved radius of the eighth signal line 2408 at the second regions 285B, the seventh signal line 2407 may be formed from a material different from the eighth signal line 2408. In an example, since the curved radius of the seventh signal line 2407 is less than the curved radius of the eighth signal line 2408, a bending strength of the material for forming the seventh signal line 2407 is larger than a bending strength of the material for forming the eighth signal line 2408. For example, the seventh signal line 2407 may be formed from metal materials such as copper, silver or the like, and the eighth signal line 2408 may be formed from conductive materials such as ITO (Indium Tin Oxide). In the embodiments, the signal lines having small curved radii are formed from materials having large bending strength, such as copper, silver or the like, so as to reduce or even eliminate a case in which the signal lines are broken off when they are bent, thereby increasing a product yield.

It should be understood that the embodiments shown in FIG. 6, FIG. 8 and FIG. 11 have all the advantages of the embodiments shown in FIGS. 2A-2C, and details are not described herein again.

Hereinafter, a flow of an exemplary method of manufacturing a flexible touch panel according to some embodiments of the present disclosure will be described in detail with reference to FIGS. 3A to 3D.

Figure 3A:
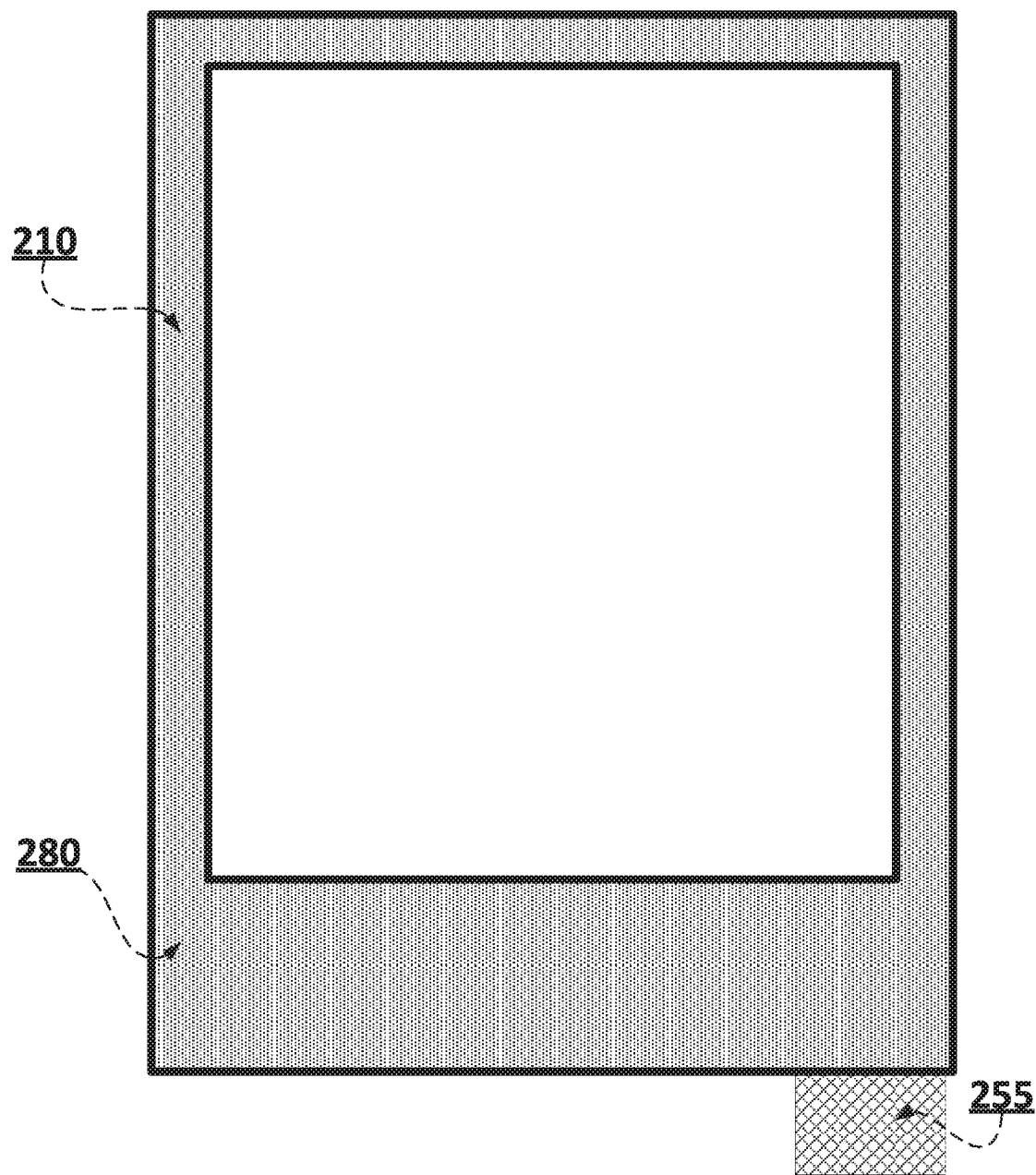
FIG. 3A to FIG. 3D are schematic plan views illustrating various stages of a method of manufacturing a flexible touch panel according to some embodiments of the present disclosure.

FIGS. 3A to 3D are schematic plan views illustrating various stages of the method of manufacturing a flexible touch panel 200 according to some embodiments of the present disclosure. As shown in FIG. 3A, a region occupied by the flexible substrate extension 255 is previously reserved on an initial flexible substrate which is used as a manufacturing plane. Although the initial flexible substrate illustrated in FIG. 3A appears to have the same shape as the flexible substrate of a final product, it should be noted that a step of cutting the initial flexible substrate into the final flexible substrate is not necessarily performed from the very beginning, and the step may also be performed in any subsequent processes.

For example, as shown in FIG. 3A, a black matrix frame 280 may be formed on the substrate 210 firstly. After forming the black matrix frame 280, the entire flexible touch panel 200 may be punched along an entire outer edge of both the black matrix frame 280 and the flexible substrate extension 255. In embodiments in which the punching is performed, it is necessary to adjust a shape of a cutter to correspond to the flexible substrate extension 255 so as to ensure that the signal line extensions 257 protruding from an outer edge of the black matrix have a good and complete shape and structure. In other words, a punching and cutting tool corresponding to the structure of the extension may be used to perform the cutting required by the embodiments of the present disclosure. Thus, it is to be appreciated that the flexible substrate 210 may be formed by integrally cutting the edges of both the flexible substrate body and at least one flexible substrate extension 255 such that the flexible substrate body and the flexible substrate extension 255 are integrally formed. In the embodiments, the flexible substrate extension 255 and the flexible substrate body 211 are integrally formed. In other words, the flexible substrate extension 255 may be a portion that protrudes from the flexible substrate body 211, both of the flexible substrate extension 255 and the flexible substrate body 211 may be formed from the same material and formed through the same manufacturing process, thereby improving manufacturing efficiency and saving production costs.

Figure 3B:
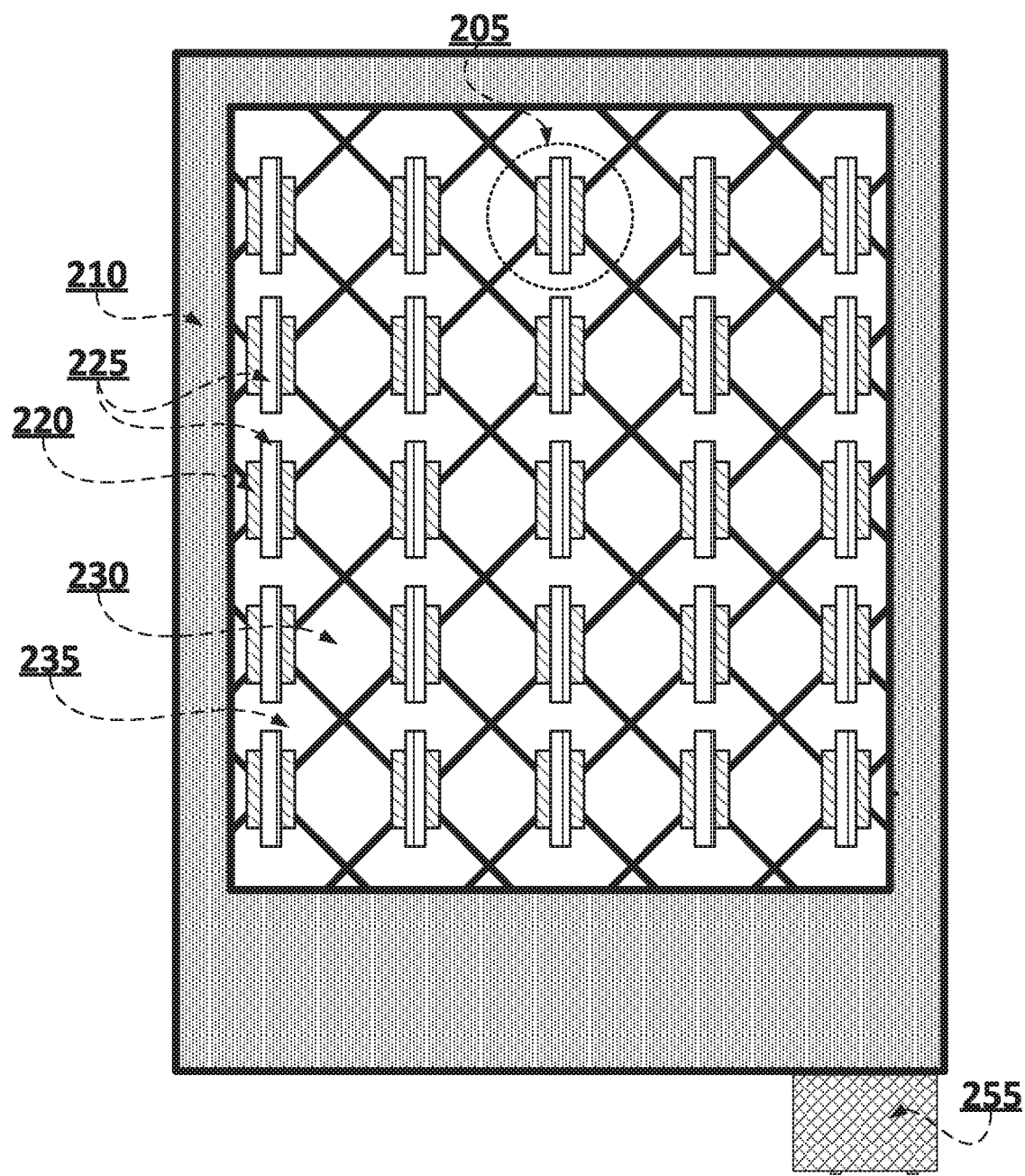

Next, as shown in FIG. 3B, a plurality of touch units 205 may be formed on the flexible substrate 210. For example, as shown in FIG. 3B and FIG. 2C, a conductive metal layer may be formed on the flexible substrate body 211 and the at least one flexible substrate extension 255, and then a patterning process is performed on the conductive metal layer to form the conductive bridge 225 and the signal line 240. Then, an insulating protective layer 220 covering both the conductive bridge 255 and the signal line 240 is formed on the flexible substrate body 211 and the at least one flexible substrate extension 255. Next, a plurality of via holes are formed in the insulating protective layer 220. Then, a conductive material layer such as ITO is deposited on the insulating protective layer 220 to form a conductive plug 2201 in the via hole, and a patterning process is performed on the conductive material layer to form a plurality of transmitting electrodes 230, a plurality of conductive portions 231, and a plurality of receiving electrodes 235.

In addition, as described above, in a case employing other electrode pattern arrangements, the steps may be adjusted accordingly as long as a plurality of touch units 205 are formed on the flexible substrate. For example, in the design of two-layer electrode patterns, the transmitting electrodes 230 and the receiving electrodes 235 may be formed one after another, but not simultaneously formed.

Figure 3C:
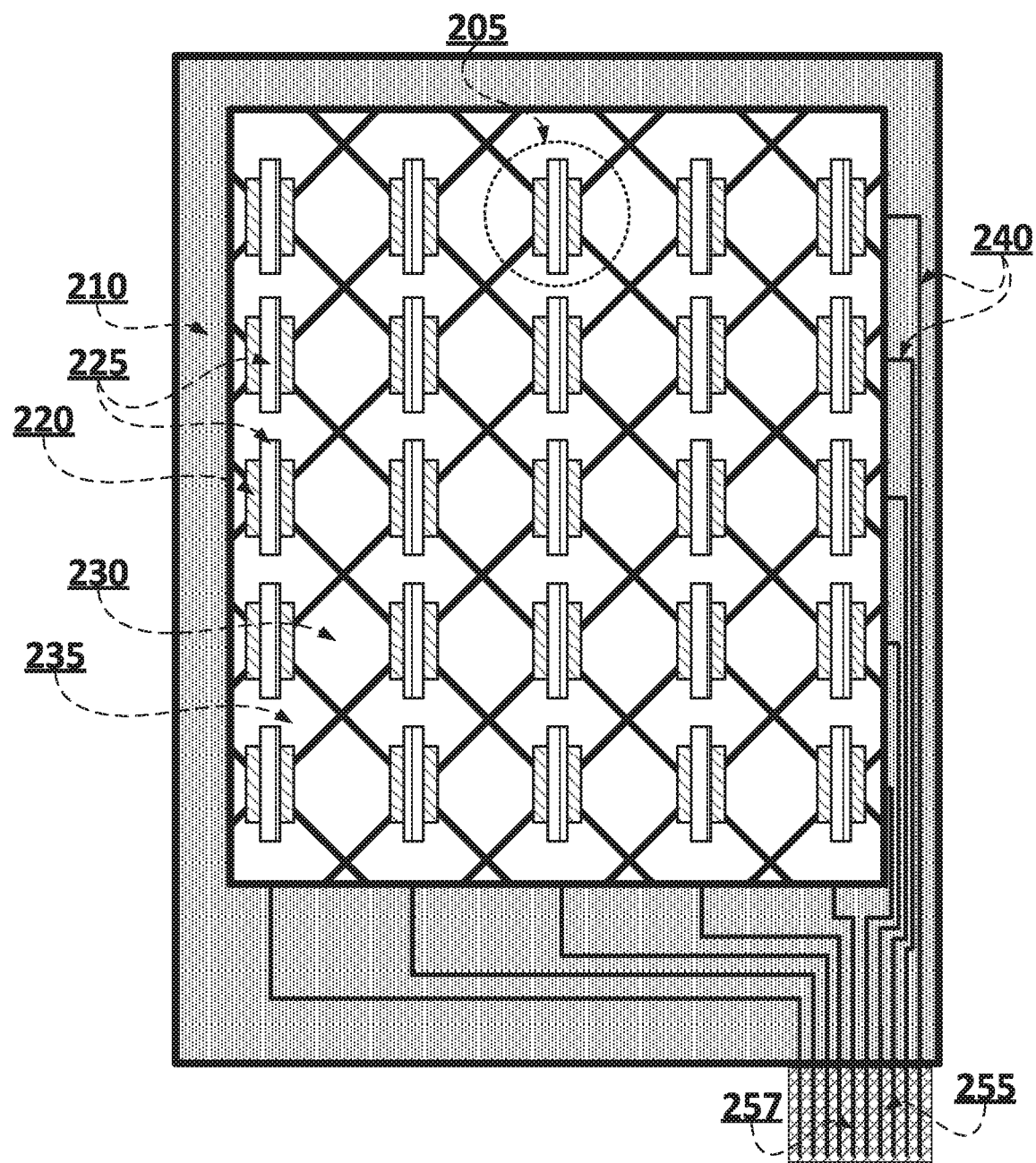

Next, as shown in FIG. 3C, at least one signal line 240 electrically connected to the plurality of touch units 205 may be formed on the flexible substrate such that the at least one signal line 240 has a signal line extension 257 which extends outward at a predetermined area of the flexible substrate so as to be directly electrically connectable to the external driving circuit 260. In some embodiments, the predetermined area may be a part of a region of the flexible substrate that corresponds to the black matrix frame. Although the predetermined area is illustrated as the lower right corner of the flexible substrate 210 and is generally rectangular in FIG. 3C, the present disclosure is not limited thereto. In fact, the predetermined area may also be an area having other suitable shapes at other positions, or a plurality of areas at a plurality of positions, which may be determined according to functions, standards, requirements, and the like required for the final product. In other words, in some embodiments, at least one signal line 240 may have a first portion (e.g., a portion of signal line 240 on the flexible substrate body) disposed on the flexible substrate body and a second portion (e.g., signal line extension 257) disposed on the flexible substrate extension 255.

In some embodiments, the first portion of the at least one signal line 240 disposed on the flexible substrate body and the second portion of the at least one signal line 240 disposed on the flexible substrate extension 255 may be integrally formed. For example, a pattern of the signal line extension portion 257 may be formed while a pattern of the signal line 240 is formed. For example, when a photolithography process for the signal line is performed, a pattern on a mask corresponding to the original bonding area may be firstly modified so that the signal line on the original bonding area is appropriately extended until it exceeds the edge of the black matrix by an appropriate distance, and then a normal lithography process is performed. At this time, the signal line of the original bonding area remaining on the flexible substrate 210 is relatively long and exceeds the outer edge of the black matrix by the appropriate distance. Therefore, a protruding portion of the flexible touch panel is equal in size to the flexible circuit board 180 shown in FIG. 1 and has the same function as the flexible circuit board 180. Next, other necessary manufacturing and inspection processes may be performed.

It should be noted that, although the signal line 240 and its extension 257 are illustrated as being formed after the touch unit 205 is formed in FIGS. 3B and 3C, the present disclosure is not limited thereto. In fact, the signal line 240 and its extension 257 may be formed simultaneously with, before or after the touch unit 205 is formed. For example, the signal line 240 (including the first portion 241 and the second portion 257 thereof) may be formed simultaneously with the conductive bridge 225. Since the signal line 240 and the conductive bridge 225 may both be formed from a metal material, the signal line 240 and the conductive bridge 225 may be formed in the same patterning process to save the number of patterning processes. For example, a pattern of the electrode and a pattern of the signal line may be designed so that the first signal line 240 which is electrically connected to and disposed in the same layer as the transmitting electrodes 230 of the at least one touch unit 205 may be formed. In addition, a pattern of the electrode and a pattern of the signal line may be designed so that a second signal line 240 which is electrically connected to and disposed in the same layer as the receiving electrodes 235 of the at least one touch unit. In this way, the manufacturing process may be saved and the production cost may be reduced.

Figure 3D:
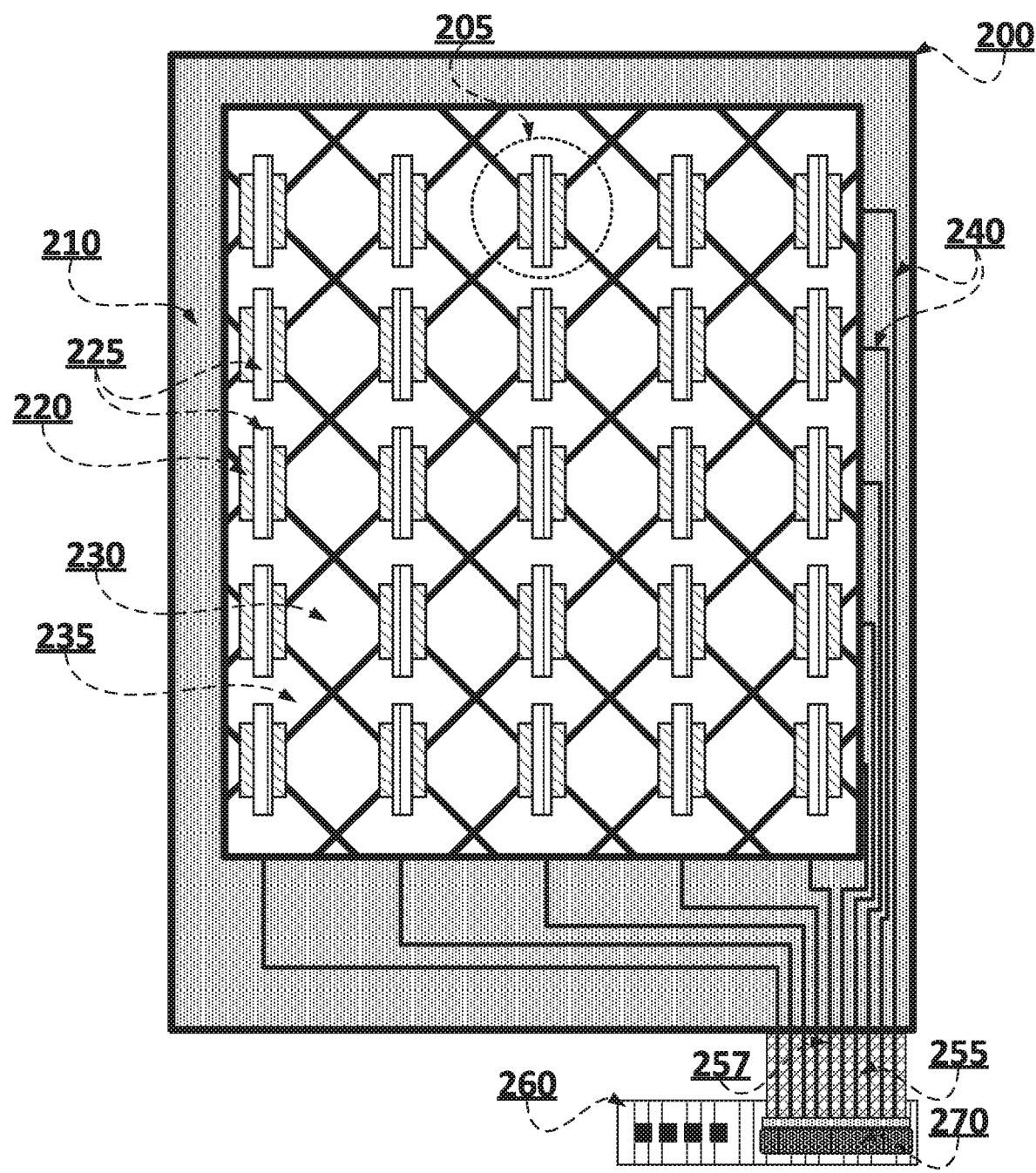

Next, as shown in FIG. 3D, the flexible touch panel 200 shown in FIG. 3C may be connected to the driving circuit 260 and packaged to complete the overall process of the flexible touch panel. The packaged flexible touch panel 200 may be connected to the driving circuit 260 through the PCB/FPC interfaces 270 on the driving circuit 260 to implement the electrical connection between the flexible touch panel 200 and its driving circuit 260. The specific connection manners may depend on the functions, requirements, standards, and the like required for product design. In some embodiments, the driving circuit 260 of the flexible touch display including the aforementioned flexible touch panel 200 and the driving circuit 260 may be bent to the back face of the flexible substrate 210 by means of the flexible substrate extension 255.

It should be noted that, in the embodiments, the black matrix 280 is formed in the frame of the flexible substrate 210 (i.e., the flexible substrate body), and it is not necessary to form a black matrix on the flexible substrate extension 255 as the flexible substrate extension 255 and the extension 257 thereon are bent to the back face of the flexible substrate 210 to be shielded by the black matrix frame.

In addition, in some embodiments, the flexible touch panel 200 may be bonded to a display module (e.g., a liquid crystal display module or an organic electroluminescent display module, or the like) to form a flexible touch display. In addition, in other embodiments in which touch layers may be embedded in the display module (for example, using In-cell technology, On-cell technology, etc.), similarly, the signal lines connecting the flexible display module to its external driving circuit may also be disposed on an extension (similar to the flexible substrate extension 255 of the flexible substrate 210 of the flexible touch panel 200 described above) of the flexible substrate, so that the FPC required in the display module may also be omitted. That is, the signal line extension 257 may include not only an extension of a signal line for electrically connecting to the touch unit, but also an extension of the signal line for electrically connecting to the display module.

By employing such a flexible touch panel manufacturing process, a direct connection between the flexible touch screen and its driving circuit may be achieved. In such a case, the connection between the flexible touch screen and the driving circuit may be realized without using the flexible circuit board, thereby reducing the manufacturing process of the touch module, reducing equipment and personnel investment, and avoiding using the flexible circuit board. As a result, an efficiency is improved, production costs are saved and product competitiveness is improved.

Next, a flowchart of an exemplary method of manufacturing a flexible touch panel according to some embodiments of the present disclosure will be described in detail with reference to FIG. 4.

Figure 4:
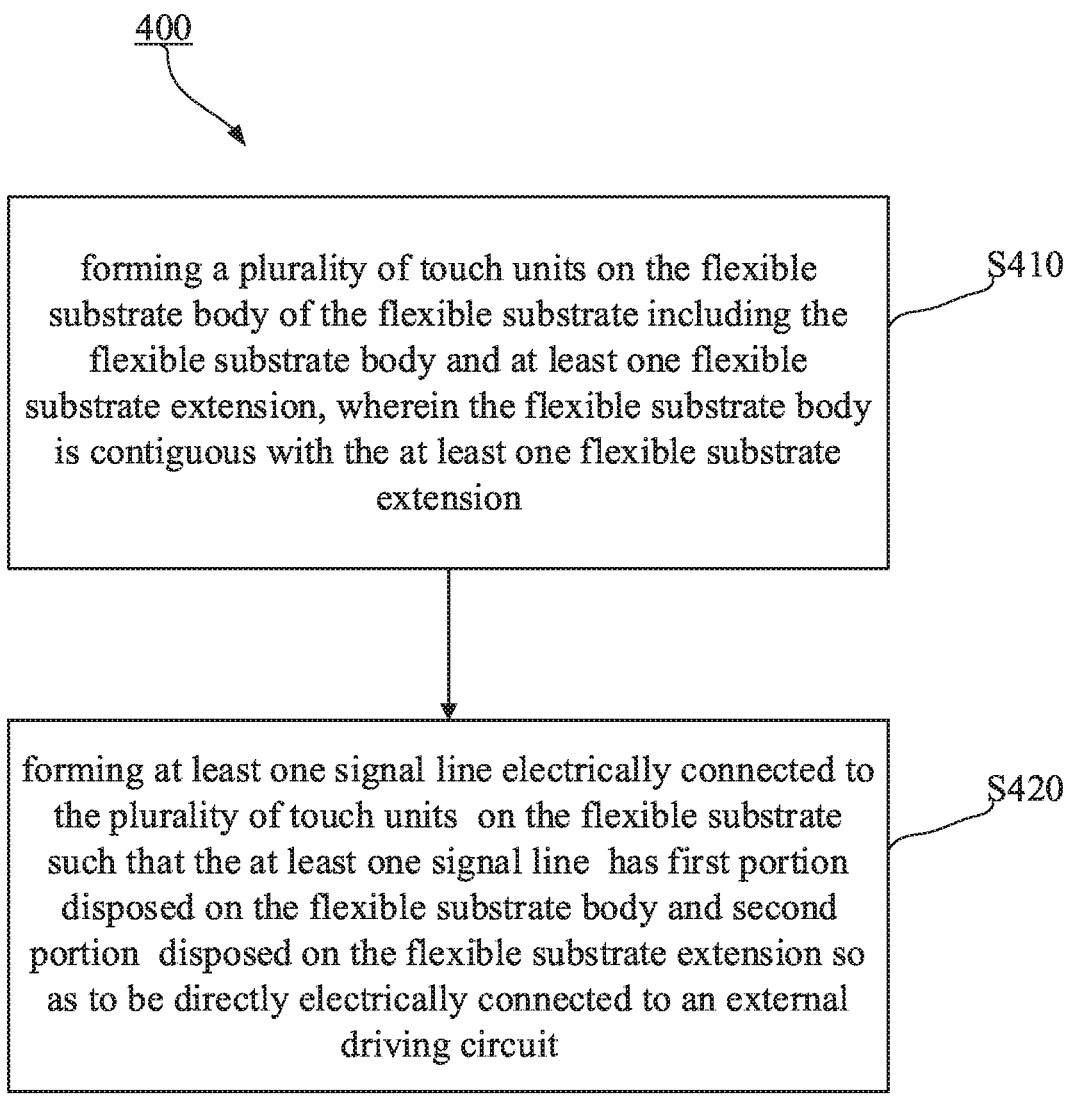
FIG. 4 is a flow chart showing an exemplary method of manufacturing a flexible touch panel according to some embodiments of the present disclosure.

FIG. 4 is a flowchart illustrating an exemplary method 400 of manufacturing a flexible touch panel according to some embodiments of the present disclosure. As shown in FIG. 4, the method 400 may include steps S410 and S420. According to some embodiments of the present disclosure, some of the steps of the method 400 may be performed separately or in combination, and may be performed in parallel or sequentially, and are not limited to the specific operational sequence shown in FIG. 4. For example, step S410 and step S420 may be performed in parallel, sequentially, or in reverse order.

The method 400 may begin at step S410. In the step S410, a plurality of touch units 205 are formed on the flexible substrate body of the flexible substrate 210 including the flexible substrate body 211 and at least one flexible substrate extension 255, wherein the flexible substrate body is contiguous with the at least one flexible substrate extension 255.

In the step S420, at least one signal line 240 electrically connected to the plurality of touch units 205 may be formed on the flexible substrate 210 such that the at least one signal line 240 has the first portion 241 disposed on the flexible substrate body and the second portion 257 disposed on the flexible substrate extension 255 so as to be directly electrically connected to an external driving circuit.

In some embodiments, the flexible substrate 210 may be formed by integrally cutting the edges of both the flexible substrate body and the at least one flexible substrate extension 255 such that the flexible substrate body and the flexible substrate extension 255 are integrally formed. In some embodiments, the first portion 241 and the second portion 257 of the at least one signal line 240 may be integrally formed.

In some embodiments, the step S420 may include: forming a conductive metal layer on the flexible substrate body 211 and the at least one flexible substrate extension 255; and performing a patterning process on the conductive metal layer to form the conductive bridge 225 and the at least one signal line 240.

In some embodiments, the step S420 may include: forming a first signal line which is electrically connected to and disposed in the same layer as the transmitting electrodes 230 of the at least one touch unit 205; and forming a second signal line which is electrically connected to and disposed in the same layer as the receiving electrodes 235 of the at least one touch unit.

Moreover, in some embodiments, a flexible touch display is also provided. The flexible touch display may include a flexible touch panel as described above. The flexible touch display may be applied to, but not limited to, a smart phone, a tablet, a flexible device, a wearable device, and the like. In some embodiments, an external driving circuit of the flexible touch display may be bent to the back face of the flexible touch panel by means of the flexible substrate extension of the flexible touch panel.

In the above embodiments, by employing the design of the signal line of the flexible touch screen according to some embodiments of the present disclosure, and more specifically, by changing the configuration and the wiring in an area in which the signal lines of the flexible touch screen are leaded out, the direct connection between the flexible touch screen and its driving circuit is realized. In such a case, the connection between the flexible touch screen and the driving circuit may be realized without using the flexible circuit board, thereby reducing the manufacturing process of the touch module, reducing equipment and personnel investment, and avoiding using the flexible circuit board. As a result, an efficiency is improved, production costs are saved and product competitiveness is improved.

The present disclosure has been described in connection with preferred embodiments. It will be appreciated that various other changes, substitutions and additions may be made by those skilled in the art without departing from the spirit and scope of the present disclosure. Therefore, the scope of the present disclosure is not limited to the specific embodiments as described above, and shall be defined by appended claims.

In addition, functions which have been described herein as being implemented by pure hardware, software, and/or firmware may also be implemented by dedicated hardware, a combination of general-purpose hardware and software, and the like. For example, functions which have been described as being implemented by dedicated hardware (e.g., Field Programmable Gate Array (FPGA), Application Specific Integrated Circuit (ASIC), etc.) may be implemented by a combination of general-purpose hardware (e.g., central processing unit (CPU), digital signal processing (DSP) with software, and vice versa.

What is claimed is:
1. A flexible touch panel comprising:
    a flexible substrate comprising a flexible substrate body and at least one flexible substrate extension, the flexible substrate body being contiguous with the at least one flexible substrate extension;

a plurality of touch units on the flexible substrate body, the plurality of touch units comprise a plurality of first electrodes and a plurality of second electrodes; and a plurality of signal lines which are disposed on the flexible substrate and electrically connected to the plurality of touch units respectively, wherein each of the signal lines comprises a first portion on the flexible substrate body and a second portion on the flexible substrate extension so that each of the signal lines is directly connectable to an external driving circuit;

wherein the flexible touch panel further comprises a fan-out region on the flexible substrate, and the fan-out region is located between the plurality of touch units and the flexible substrate extension;

wherein the plurality of signal lines comprise a first group of signal lines and a second group of signal lines electrically connected to the plurality of first electrodes, curved radii of the first group of signal lines at the fan-out region are less than curved radii of the second group of signal lines at the fan-out region, and a bending strength of a material of the first group of signal lines is larger than a bending strength of a material of the second group of signal lines, and the plurality of signal lines further comprise a third group of signal lines and a fourth group of signal lines electrically connected to the plurality of second electrodes, curved radii of the third group of signal lines at the fan-out region are less than curved radii of the fourth group of signal lines at the fan-out region, and a bending strength of a material of the third group of signal lines is larger than a bending strength of a material of the fourth group of signal lines.

2. The flexible touch panel of claim 1, wherein the flexible substrate body and the flexible substrate extension are integrally formed.

3. The flexible touch panel of claim 1, wherein the first portion and the second portion of each of the signal lines are integrally formed.

4. The flexible touch panel of claim 1, wherein the plurality of signal lines comprise a first signal line electrically connected to the plurality of first electrodes and a second signal line electrically connected to the plurality of second electrodes, and each of the first signal line and the second signal line comprises the first portion on the flexible substrate body and the second portion on the flexible substrate extension.

5. The flexible touch panel of claim 4, wherein the plurality of first electrodes are located in the same layer as the plurality of second electrodes, the plurality of first electrodes are electrically connected with one another through conductive portions, and the plurality of second electrodes are electrically connected with one another through conductive bridges; and wherein the conductive portions are located in the same layer as the plurality of first electrodes, the conductive bridges are located in a different layer from the plurality of second electrodes, and an insulating protective layer is disposed between a layer in which the plurality of second electrodes are located and a layer in which the conductive bridges are located.

6. The flexible touch panel of claim 5, wherein both the first signal line and the second signal line are located in the same layer as the conductive bridges.

7. The flexible touch panel of claim 1, wherein the plurality of signal lines comprise a first signal line disposed adjacent to a left side edge of the flexible substrate and a second signal line disposed adjacent to a right side edge of the flexible substrate; and the flexible substrate comprises one flexible substrate extension, and the one flexible substrate extension is located on a side of the flexible substrate body facing the external driving circuit.

8. The flexible touch panel of claim 7, wherein a ratio of an area of an orthographic projection of the one flexible substrate extension in a direction perpendicular to the flexible substrate to an area of an orthographic projection of the flexible substrate body in the direction perpendicular to the flexible substrate is in a range of 1/20 to 1/5.

9. The flexible touch panel of claim 1, wherein the at least one flexible substrate extension comprises a first flexible substrate extension and a second flexible substrate extension, the first flexible substrate extension and the second flexible substrate extension are both located on a side of the flexible substrate body facing the external driving circuit, the first flexible substrate extension is adjacent to a first side edge of the flexible substrate body, and the second flexible substrate extension is adjacent to a second side edge of the flexible substrate body, the second side edge being opposite to the first side edge.

10. The flexible touch panel of claim 9, wherein a ratio of an area of an orthographic projection of each of the first flexible substrate extension and the second flexible substrate extension in a direction perpendicular to the flexible substrate to an area of an orthographic projection of the flexible substrate body in the direction perpendicular to the flexible substrate is in a range of 1/40 to 1/5.

11. A flexible touch display comprising the flexible touch panel of claim 1.

12. The flexible touch panel of claim 1, wherein materials of the plurality of signal lines are further related to lengths of the signal lines, respectively.

13. The flexible touch panel of claim 12, wherein the first group of signal lines comprise a first signal line, and the second group of signal lines comprise a second signal line, a length of the first signal line is less than a length of the second signal line, and an electrical resistivity of a material of the first signal line is larger than an electrical resistivity of a material of the second signal line.

14. The flexible touch panel of claim 13, wherein the material of the first signal line comprises indium tin oxide, and the material of the second signal line comprises a metal material.

15. The flexible touch panel of claim 14, wherein the first signal line is located in the same layer as the plurality of first electrodes, the plurality of second electrodes and the conductive portions, and the second signal line is located in the same layer as conductive bridges.

16. The flexible touch panel of claim 1, wherein the first group of signal lines comprise a first signal line, and the second group of signal lines comprise a second signal line, a curved radius of the first signal line at the fan-out region is less than a curved radius of the second signal line at the fan-out region, and a bending strength of a material of the first signal line is larger than a bending strength of a material of the second signal line.

17. The flexible touch panel of claim 16, wherein the material of the first signal line comprises a metal material, and the material of the second signal line comprises indium tin oxide.

18. The flexible touch panel of claim 17, wherein the first signal line is located in the same layer as the conductive bridges, and the second signal line is located in the same layer as the plurality of first electrodes, the plurality of second electrodes and the conductive portions.

19. A method of manufacturing a flexible touch panel comprising:
- forming a flexible substrate comprising a flexible substrate body and at least one flexible substrate extension, the flexible substrate body being contiguous with the at least one flexible substrate extension;
- forming a plurality of touch units comprising a plurality of first electrodes and a plurality of second electrodes on the flexible substrate body; and
- forming a plurality of signal lines electrically connected to the plurality of touch units on the flexible substrate, such that each of the signal lines comprises a first portion on the flexible substrate body and a second portion on the flexible substrate extension so as to be directly connectable to an external driving circuit,
- wherein the flexible touch panel further comprises a fan-out region on the flexible substrate, and the fan-out region is located between the plurality of touch units and the flexible substrate extension;
- wherein the plurality of signal lines comprise a first group of signal lines and a second group of signal lines electrically connected to the plurality of first electrodes, curved radii of the first group of signal lines at the fan-out region are less than curved radii of the second group of signal lines at the fan-out region, and a bending strength of a material of the first group of signal lines is larger than a bending strength of a material of the second group of signal lines, and
- the plurality of signal lines further comprise a third group of signal lines and a fourth group of signal lines electrically connected to the plurality of second electrodes, curved radii of the third group of signal lines at the fan-out region are less than curved radii of the fourth group of signal lines at the fan-out region, and a bending strength of a material of the third group of signal lines is larger than a bending strength of a material of the fourth group of signal lines.

* * * * *